United States Patent [19]

Uemura et al.

[11] Patent Number: 5,680,097
[45] Date of Patent: Oct. 21, 1997

[54] VEHICLE RUN SAFETY APPARATUS

[75] Inventors: Hiroki Uemura; Tadayuki Niibe; Ayumu Doi; Tohru Yoshioka; Ken-ichi Okuda; Yasunori Yamamoto; Satoshi Morioka; Tomohiko Adachi, all of Hiroshima-ken, Japan

[73] Assignee: Mazda Motor Corporation, Hiroshima-ken, Japan

[21] Appl. No.: 162,468

[22] Filed: Dec. 7, 1993

[30] Foreign Application Priority Data

| Dec. 10, 1992 | [JP] | Japan | 4-330313 |
| Dec. 10, 1992 | [JP] | Japan | 4-330319 |
| Dec. 21, 1992 | [JP] | Japan | 4-339880 |
| Jan. 8, 1993 | [JP] | Japan | 5-001502 |
| Jan. 8, 1993 | [JP] | Japan | 5-001505 |

[51] Int. Cl.$^6$ ............................................. B60Q 1/00
[52] U.S. Cl. .................... 340/435; 180/169; 340/903; 342/70; 364/461
[58] Field of Search ................ 340/903, 951, 340/435; 348/148, 170, 149; 342/29, 41, 55, 70, 72, 179; 367/99, 909; 356/1; 180/169; 364/461

[56] References Cited

U.S. PATENT DOCUMENTS

| 4,257,703 | 3/1981 | Goodrich | 340/903 |
| 4,872,051 | 10/1989 | Dye | 340/903 |
| 5,087,918 | 2/1992 | May et al. | 342/70 |
| 5,208,591 | 5/1993 | Ybarra et al. | 340/961 |
| 5,304,980 | 4/1994 | Maekawa | 340/903 |
| 5,309,137 | 5/1994 | Kajiwara | 340/903 |
| 5,343,206 | 8/1994 | Ansaldi et al. | 342/72 |
| 5,381,140 | 1/1995 | Kureda et al. | 340/961 |
| 5,386,285 | 1/1995 | Asayama | 340/435 |

FOREIGN PATENT DOCUMENTS 53-16230  2/1978  Japan.

*Primary Examiner*—Brent A. Swarthout
*Attorney, Agent, or Firm*—Sixbey, Friedman, Leedom & Ferguson, P.C.; Gerald J. Ferguson, Jr.; Donald R. Studebaker

[57] ABSTRACT

When information of an obstacle is not outputted from a radar device, a presumption device presumes at least a present value of a distance between a vehicle and the obstacle based on information in a memory part obtained until the time, and a contact-possibility judgment device judges a possibility of contact of the vehicle with the obstacle based on the information from the presumption device. A detection device is provided for detecting conditions at the time when the information of the obstacle is not outputted from the radar device, for example, a relation of relative position of the obstacle to the vehicle. Further, a restriction device is provided for restricting the presumption by the presumption device according to the relation of relative position. Thus, a possibility of contact of the vehicle with the obstacle running forward of the vehicle is appropriately judged and mis-operations of an alarm, an automatic braking and the like are prevented, while ensuring running safety.

5 Claims, 17 Drawing Sheets

VEHICLE RUN SAFETY APPARATUS

BACKGROUND OF THE INVENTION

This invention relates to a vehicle run safety apparatus for avoiding contact of a vehicle with an obstacle existing forward of the vehicle such as a vehicle running forward, and relates to in particular improvements of an apparatus-which detects a distance between the vehicle and the obstacle and the like by the use of a radar device.

Conventionally, as a vehicle run safety apparatus of this kind, there has been known an apparatus, for example, as disclosed in Japanese Patent Application Open Gazette No.53-16230. In this apparatus, a distance and a relative velocity between a vehicle and a forward obstacle of the vehicle by a radar device is continuously detected, and whether there is a possibility of contact of the vehicle with the forward obstacle is judged based on the detected results. Upon the possibility of contact, an automatic braking device is operated to apply braking force to each wheel or an alarm device is operated to inform the driver of an alarm.

Especially, the above-mentioned prior art teaches that when information of the obstacle is not outputted from the radar device, there are presumed present values of the distance and the relative velocity between the vehicle and the obstacle by using information obtained until the time and the possibility of contact is judged based on the presumed values.

However, this apparatus involves a problem because when the information of the obstacle is not outputted from the radar device, the possibility of contact is uniformly judged by presumed present values of a distance and the like between the vehicle and the obstacle according to the information obtained until the time. In detail, if the obstacle is relatively moving aside from a running path of the vehicle while existing relatively close to the vehicle at the time when the information of the obstacle is not outputted from the radar device, there is no possibility of contact. Nevertheless, present values of a distance and the like between the vehicle and the obstacle are unnecessarily presumed which may misjudge the possibility of contact. This invites mis-operations. of the alarm and the automatic braking. In addition, since the possibility of contact of the vehicle with another obstacle cannot be judged during the unnecessary presumption, there cannot be ensured a prompt and appropriate judgment of the possibility of contact.

SUMMARY OF THE INVENTION

This invention has an object of providing a vehicle run safety apparatus for appropriately judging a possibility of contact of a vehicle with an obstacle, and preventing mis-operations of an alarm, an automatic braking and the like, while ensuring a running safety of the vehicle, by restricting presumption of a present value of a distance between the vehicle and the obstacle and judgment of the possibility of contact based on the presumption, according to a situation at the time when information of the obstacle is not outputted from a radar device.

To attain the foregoing object, a vehicle run safety apparatus of this invention comprises: a radar device for detecting an obstacle which exists forward by transmitting radar waves forward of a vehicle; presumption means for presuming, when information of the obstacle is not outputted from the radar device, at least a present value of a distance between the vehicle and the obstacle based on information obtained until the time; contact-possibility judgment means for usually judging a possibility of contact of the vehicle with the obstacle based on information of the obstacle detected by the radar device and for judging the possibility of contact based on information from the presumption means when the information of the obstacle is not outputted from the radar device; and restriction means for restricting presumption by the presumption means according to the situation at the time when the information of the obstacle is not outputted from the radar device.

Under the above construction, when presumption is required for the situation at the time when the information of the obstacle is not outputted from the radar device, for example, when the obstacle was moving toward the vehicle to contact with the vehicle at the time, the presumption means presumes at least a present value of a distance between the vehicle and the obstacle based on information obtained until the obstacle information is not outputted, and then the contact-possibility judgment means judges a possibility of contact of the vehicle with the obstacle based on information from the presumption means. Then, when the possibility of contact exists, there is taken a measure such as an alarm, an automatic braking or the like thus avoiding the contact of the vehicle with the obstacle. On the other hand, when no presumption is required for the situation at the time when information of the obstacle is not outputted, the restriction means prohibits the presumption by the presumption means. Accordingly, the judgment of the possibility of contact based on the information from the presumption means cannot be made in the contact-possibility judgment means. This prevents unnecessary measures for avoiding the contact such an alarm, an automatic braking and the like. Further, since the judgment of the possibility of contact with the obstacle is suspended at a presumption stage, the contact-possibility judgment means can judge a possibility of contact with another obstacle.

The above and further objects, features and advantages of the invention will more appear from the following description of preferred embodiments when the same is read in connection with the accompanying drawings.

BRIEF DESCRIPTION OF THE DRAWING

The accompanying drawings show preferred embodiments of the present invention.

FIG. 1 is a block diagram showing an arrangement of a vehicle run safety apparatus. FIG. 2 is a flow chart showing a method of discriminating a nearest obstacle to a vehicle. FIG. 3 is a flow chart showing a method of calculating a distance and the like between the vehicle and the nearest obstacle. FIG. 4 is a schematic diagram showing a relation of position between the vehicle and a running path thereof.

FIG. 5 is a diagram corresponding to FIG. 2. FIG. 6 is a diagram corresponding to FIG. 3.

FIG. 7 is a diagram corresponding to FIG. 2. FIG. 8 is a diagram corresponding to FIG. 3.

FIG. 9 is a diagram corresponding to FIG. 1. FIG. 10 is a diagram corresponding to FIG. 3.

FIG. 12 is a diagram corresponding to FIG. 1. FIG. 13 is a diagram corresponding to FIG. 3.

FIG. 14 is a diagram corresponding to FIG. 1. FIG. 15 is a diagram corresponding to FIG. 3.

FIG. 16 is a diagram corresponding to FIG. 1. FIG. 17 is a diagram corresponding to FIG. 3.

DESCRIPTION OF THE PREFERRED EMBODIMENTS

Description is made below about preferred embodiments of the present invention with reference to the accompanying drawings.

Figure 1:
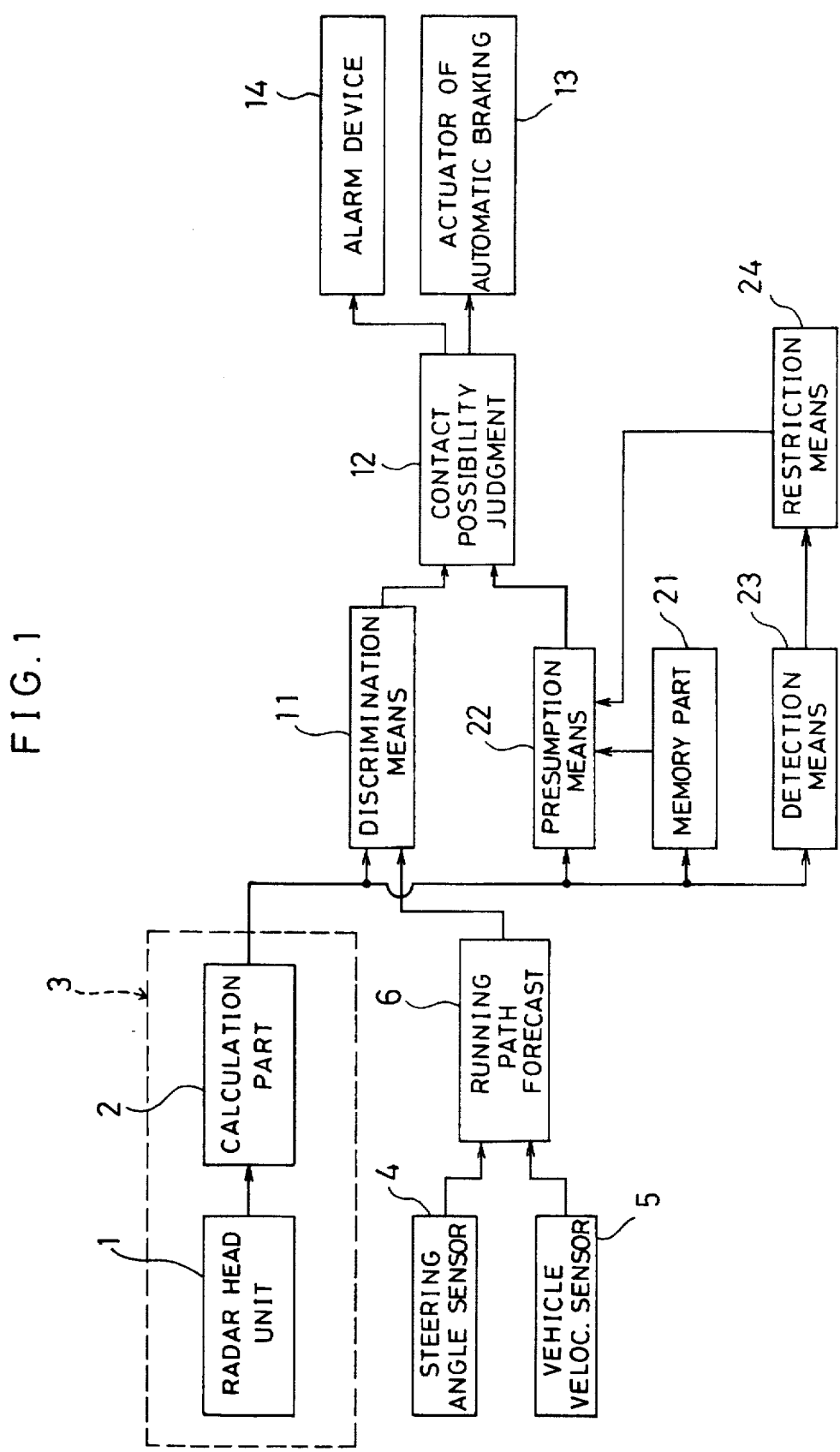
FIGS. 1, 2, 3 and 4 show a first embodiment of the invention.

FIG. 1 shows in block an arrangement of a vehicle run safety apparatus according to a first embodiment of the present invention. In this figure, reference numeral 1 indicates a radar head unit which is to be provided at a front part of a car body. The radar head unit 1 has a construction in which a transmission part transmits, forward of a vehicle, pulsed laser light as radar waves and a receiving part recieves light reflected from the obstacle existing forward of the vehicle such as a vehicle running forward of the vehicle or the like. Further, the radar head unit 1 is a scan-type one for scanning, in a horizontal direction at a relatively wide angle, by pulsed laser light transmitted from the transmission part. Signals from the radar head unit 1 are entered in a calculation part 2. The calculation part 2 calculates a distance between the vehicle and each of the obstacles existing within scanning, a direction of each obstacle to the vehicle and the like, based on a lag time of received laser light behind a transmitted time of laser light. The radar head unit 1 and the calculation part 2 form a scan-type radar device 8 for detecting obstacles existing forward of the vehicle.

Reference numerals 4 and 5 indicate a steering angle sensor for detecting a steering angle of a steering wheel (hereinafter referred to as a steering angle), and a vehicle velocity sensor for detecting a vehicle velocity of the vehicle, respectively. Detected signals of the sensors 4, 5 are entered in running path forecast means 6. The running path forecast means 6 forecasts a running path of the vehicle based on a steering angle θH and a vehicle velocity v0, in detail, calculates a curvature radius R of the running path. Further, the running path forecast means 6 also calculates a side-slip angle β of the vehicle. The curvature radius R and the side-slip angle β are calculated as the following formulae:

$$R = (1 + Av0^2) \cdot l \cdot N/\theta H,$$

$$\beta = \frac{-1 + (m/2l)(lf/lr \cdot kr)v0^2}{1 + Av0^2} (lr/l)(\theta H/N).$$

In the above formulae, A indicates a stability factor, N indicates a steering gear ratio, l indicates a wheel base, lf indicates a distance between a gravity center of the vehicle and a front wheel, lr indicates a distance between the gravity center and a rear wheel, m indicates mass of the vehicle and kr indicates a cornering power per rear wheel.

Reference numeral 11 indicates discrimination means for discriminating an obstacle which exists in an area along the running path forecasted by the running path forecast means 6 and which is a nearest one to the vehicle (hereinafter referred to as a nearest obstacle). Information of the nearest obstacle discriminated by the discrimination means 11 is entered in contact-possibility judgment means 12. The judgment means 12 judges the possibility of contact of the vehicle with the obstacle. Then, when the possibility of contact exists, an actuator 13 of an automatic braking device is operated according to control signals outputted from the judgment means 12 thus applying braking force to each wheel, and an alarm device 14 is operated before the braking thus informing the driver of an alarm.

Reference numeral 21 indicates a memory part for memorizing, for a set period, information of obstacles outputted from the radar device 3 (calculation part 2). 22 indicates presumption means for receiving the information of obstacles from the radar device 3. When information of an obstacle is not outputted from the radar device 3, the presumption means 22 continuously presumes, for a set period, a present value of a distance between the vehicle and the obstacle based on information of the obstacle in the memory part 21 which was obtained until the time. When information of a nearest obstacle is not outputted from the radar device 3 and the discrimination means 11 cannot discriminate the nearest obstacle, the contact-possibility judgment means 12 judges the possibility of contact of the vehicle with the nearest obstacle based on the information from the presumption means 22.

Reference numeral 23 indicates detection means for detecting a relation of relative position of an obstacle to the vehicle when information of the obstacle is not outputted from the radar device 3. 24 indicates restriction means for receiving signals from the detection means 23. The restriction means 24 restricts, when information of an obstacle is not outputted, presumption by the presumption means 22 according to a relation of relative position of the obstacle to the vehicle.

Figure 2:
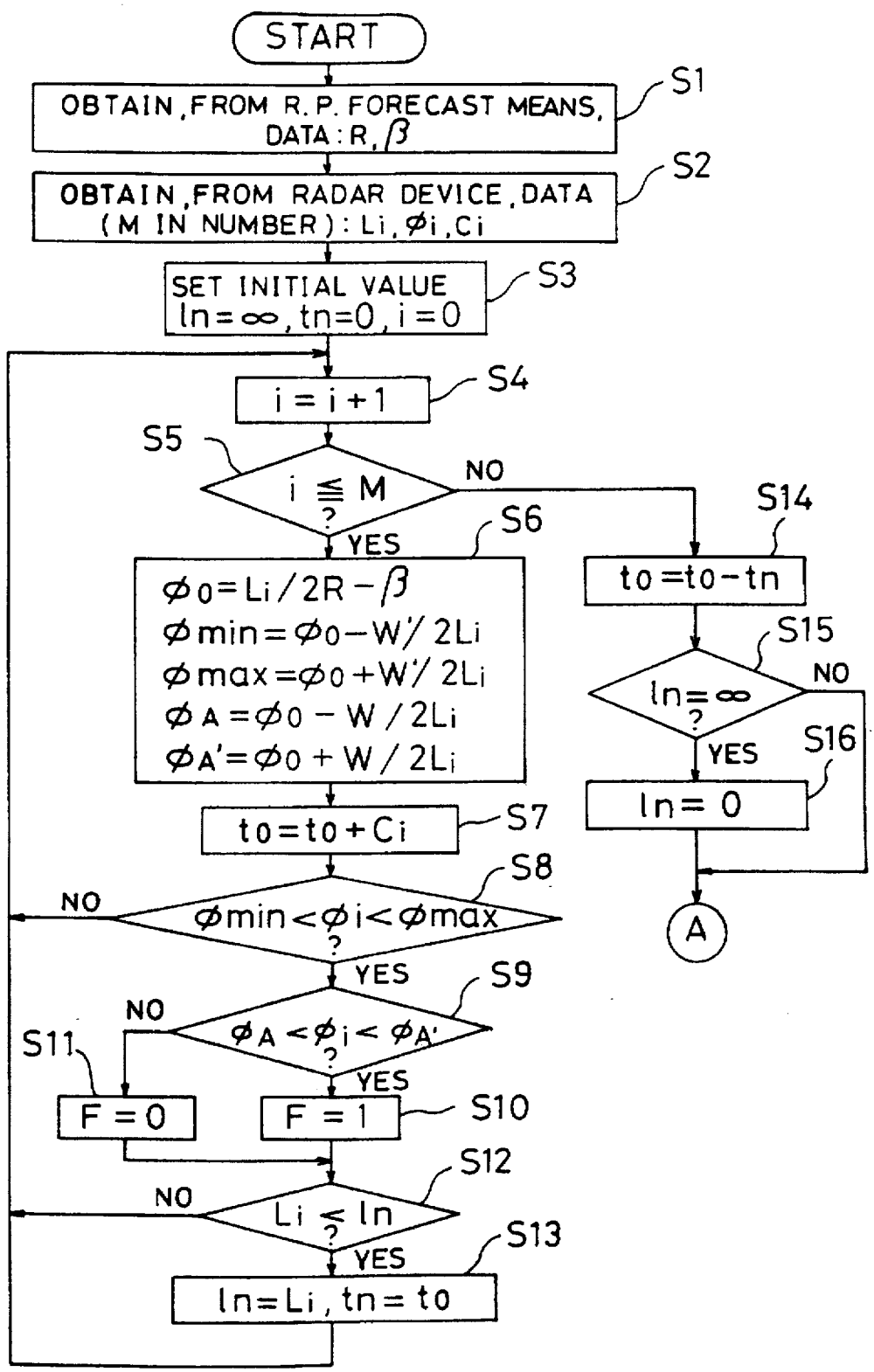
Figure 3:
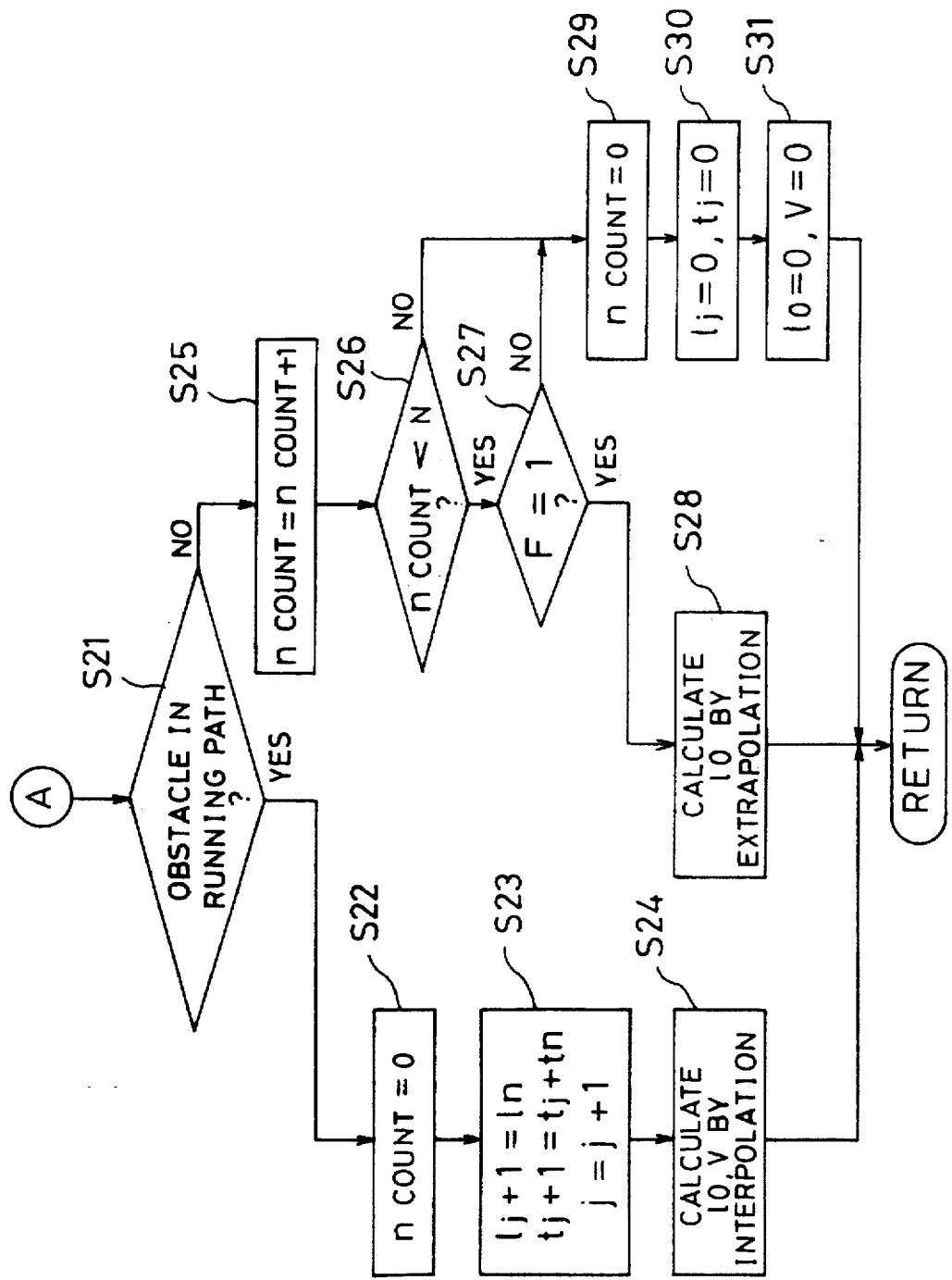

The following will discuss in detail discrimination of a nearest obstacle by the discrimination means 11, detection of a relation of relative position by the detection means 23, restriction of presumption by the restriction means 24 and the like, with reference to flow charts shown in FIGS. 2 and 3. Here, the flow chart shown in FIG. 3 is successively executed after the flow chart shown in FIG. 2.

As shown in FIG. 2, when the sequence starts, there are obtained at a step S1 data (a curvature radius R of a running path and a side-slip angle β) from the running path forecast means 6. At a step S2, data is obtained from the radar device (calculation part 2). The data of the radar device 3 is composed of data relating to M numbers of obstacles. Data of each obstacle has a distance Li (i means a number 1 to M) between the vehicle and the obstacle, a horizontal angle φi of the obstacle from the center line of the radar device (the center line approximately equal to the center line of the vehicle) and no-echo counter Ci. The no-echo counter Ci means a time when a scanning of the radar device 3 between a certain obstacle (the number i is n) and an obstacle adjacent to the former obstacle on the forward side in a scanning direction (the number i is n−1) takes.

Then, at a step S3, initial values of in, tn and i are set to infinity, 0 and 0, respectively. Here, in means a distance between the vehicle and a nearest obstacle to the vehicle out of obstacles existing in the running path of the vehicle.

After the initial values are set, i is counted up by 1 at a step S4. At a step S5, there is judged whether i is M and less. When the judgment is "YES", at a step S6, φ0, φmin, φmax, φA and φA' are calculated according to respective following formulae:

$$\phi 0 = (Li/2R) - \beta,$$

$$\phi min = \phi 0 - (W/2Li),$$

$$\phi max = \phi 0 + (W/2Li),$$

$$\phi A = \phi 0 - (W/2Li),$$

$$\phi A' = \phi 0 + (W/2Li).$$

Figure 4:
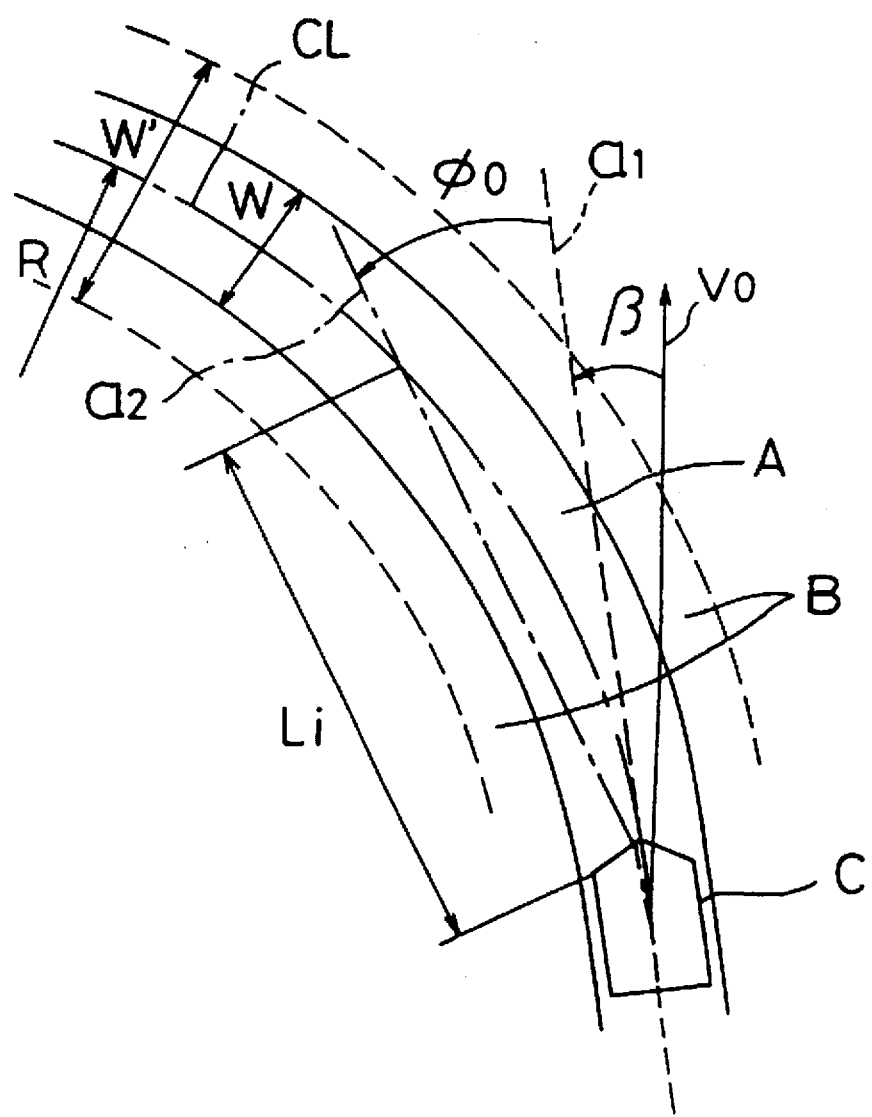

In the above formula, as shown in FIG. 4, φ0 is an included angle at which a straight line a2 connecting between the vehicle C and a center line CL of the running path forward by Li of the vehicle C meets a center line al of the vehicle (a center line of the radar device 3); the running path of the vehicle is divided into a center area A along the center line CL which has a width W approximately equal to a vehicle width, and edge areas B which are located on both sides of the center area A and have a width W' with the center line CL put therebetween; φmin and φmax are included angles at which respective straight lines connecting between the vehicle C and right and left end lines (border lines shown in broken lines) of the edge areas B on the running path forward by meet the ceehicle meet the center line al of the vehicle; φA and φA' are included angles at which respective straight lines connecting between the vehicle C and right and left end lines of the center area A (border lines between the center area A and the edge areas B shown in solid lines) on the running path forward by Li of the vehicle meet the center line al of the vehicle; and a clockwise direction is indicated by the plus sign. In FIG. 4, R is a curvature radius of the running path and β is a side-slip angle of the vehicle C, that is, an included angle at which a running direction of the vehicle C (velocity vector v0) meets the center line al.

Then, at a step S7, no-echo counter Ci is added to a time to and the added value is newly set to t0. At a step S8, there is judged whether a horizontal angle φi of an obstacle is between the above values φmin and φmax, that is, whether the obstacle exists in the areas A and B on the running path. At a step S9, there is judged whether the horizontal angle φi of the obstacle is between the above values φA and φA', that is, whether the obstacle exists in the center area A on the running path. When the judgment at the step S9 is "YES", that is, when the obstacle on the running path exists in the center area A, the flag F is set to "1" at a step S10. On the other hand, when the judgment is "NO", that is, when the obstacle on the running path exists not in the center area A but in the edge area B, the flag F is reset to "0" at a step S11. At a step S12, there is judged whether a distance Li between the obstacle on the running path and the vehicle is less than ln. When the judgment is "YES", the distance Li and the time t0 are set to in and tn respectively at a step S13 and then the sequence is returned to the step S4. The sequence is also retuned to the step S4 when the judgment at the steps S8 or S12 is "NO".

By repeating the steps S4 to S13, there is discriminated a nearest obstacle to the vehicle C on the running path out of M numbers of obstacles detected by the radar device 3 and the distance between the nearest obstacle and the vehicle is set to ln.

When the checking is complete with respect to all the data of M numbers of obstacles, a value in which tn has been lessened from t0 is newly set to t0 (=t0−tn) at a step S14. Here, the former value t0 is a value which is formed by adding no-echo counter of all the data from the time when the nearest obstacle was detected at a prior frame scanning of the radar device 3, and tn is a time when it takes from the setting at the step S13 to the detection of the nearest obstacle at one frame scanning. Accordingly, the new t0 is a time when it takes from the detection of the nearest obstacle to a detection of a last obstacle. No-echo counter Ci is added to the time t0 until the nearest obstacle is detected at a next frame scanning. Thus, there is measured a time when it takes to detect the nearest obstacle twice during two frame scannings. This time is used to calculate a relative velocity V between the vehicle and the nearest obstacle at a below-mentioned step S24.

Then, there is judged at a step S15 whether in is infinity, that is, whether in remains the value set initially. When in remains the value, in is reset to 0 at a step S16 and the sequence is moved to FIG. 3. When in is a finite value, the sequence is immediately moved to FIG. 8.

As shown in FIG. 3, there is judged at a step S21 whether the obstacle (nearest obstacle) exists in the running path of the vehicle. When the judgment is "YES", n count is reset to 0 at a step S22, and various kinds of replacements are conducted to calculate a relative velocity at a step S23. At a step S24, there is calculated a distance 10 between the vehicle and the nearest obstacle at the present time (that is, the present value of the distance) by using interpolation such as a method of least square or the like and then there is calculated a relative velocity V between the vehicle and the nearest obstacle at the present time by using the distance 10. Then, the sequence is returned.

On the other hand, when the judgment at the step S21 is "NO", n count is counted up by 1 at a step S25, there is judged at a step S26 whether n count is less than a set frequency N, and there is judged at a step S27 whether the flag F is "1". When both judgments at the steps S26 and S27 are "YES", that is, in case that a slight time has passed since a non-output time when information of the nearest obstacle was not outputted and that the obstacle had existed in the center area A of the running path before the non-output time, there is calculated at a step S28 a distance 10 between the vehicle and the nearest obstacle at the present time based on the data obtained until the time by using extrapolation. The present value of the distance 10 is presumed by using the distance in and the relative velocity V between the vehicle and the nearest obstacle at the time just before the obstacle is missed, according to the following formula:

$$10 = ln + V \cdot T.$$

In the above formula, T is a passed time since the nearest obstacle was missed.

The presumption of the distance 10 is executed by the presumption means 22. After the presumption, the sequence is returned.

When either of the judgments at the steps S26 and S27 is "NO", n count is reset to 0 at a step S29 and lj and tj are reset to 0 together at a step S30. At a step S31, the distance 10 and the relative velocity V between the vehicle and the nearest obstacle are reset to 0 together, and then the sequence is returned.

Out of a series of flow charts shown in FIGS. 2 and 3, the steps S6, S9, S10 and S11 show, in particular, detailed contents relating to detection of a relation of relative position by the detection means 23. At the steps, the detection means 23 divides a detecting area of obstacles by the radar device 3 into the center area A on the running path of the vehicle C and the edge areas B respectively located on both sides of the center area A, and detects in which of the areas A and B the obstacle existed when the information of the obstacle is not outputted from the radar device 3. The steps S27 to S31 show detailed contents for restricting presumption by the restriction means 24. At the steps, the restriction means 24 accepts presumption by the presumption means 22 when the obstacle existed in the center area A on the running path just before the information of the obstacle is not outputted, and prohibits, on the other hand, presumption by the presumption means 22 when the obstacle existed in the edge area B on the running path just before the information of the obstacle is not outputted.

The following will discuss the operation and effects of the above-mentioned first embodiment. Usually, the discrimination means 11 discriminates a nearest obstacle to a vehicle C on a running path of the vehicle C out of M numbers of obstacles detected by the radar device 3, and outputs, to the contact-possibility judgment means 12, information of the nearest obstacle (a present value of a distance 10 and a relative velocity V between the vehicle and the nearest obstacle). The judgment means 12 judges a possibility of contact of the vehicle with the nearest obstacle based on information of the obstacle from the discrimination means 11. When the possibility of contact exists, the judgment means 12 operates the actuator 13 of the automatic braking device to apply braking force to each wheel, and operates the alarm device 14 to give an alarm to the driver before the braking. Thus, there can be avoided the contact of the vehicle with the nearest obstacle on the running path to ensure the running safety of the vehicle.

On the other hand, when the information of the obstacle is not outputted from the radar device 8, the detection means 23 judges in which of the center area A and the edge areas B on the running path of the vehicle the obstacle existed just before the non-output time of the obstacle information. When the obstacle existed in the center area A, according to information in the memory part 21 obtained until the non-output time of the obstacle information, the presumption means 22 keeps a present value of a relative velocity V between the vehicle and the obstacle a prior value and presumes a present value of a distance 10 between the vehicle and the obstacle. Then, the contact-possibility judgment means 12 judges the possibility of contact of the vehicle with the obstacle based on the information from the presumption means 22. When the possibility of contact exists, the contact-possibility judgment means 12 applies an alarm and an automatic braking as measures for avoiding the contact, as in the case of the judgment of the possibility of contact based on the information of the obstacle from the discrimination means 11. Thus, there can be avoided the contact of the vehicle with the obstacle.

When the obstacle existed in the edge area B just before the non-output time of the obstacle information, the reason for the non-output of the obstacle information is that, in almost all cases, the discrimination means 11 did not discriminate the obstacle which moved outward of the areas A, B on the running path of the vehicle. In this case, presumption by the presumption means 22 is prohibited by the restriction means 24. Accordingly, in the contact-possibility judgment means 12, there cannot be made the judgment of the possibility of contact based on the information from the presumption means 22. This previously prevents unnecessary applications of an alarm and an automatic braking. Further, since the judgment of the possibility of contact of the vehicle with the obstacle is suspended at a presumption stage, the contact-possibility judgment means 12 can judge a possibility of contact of the vehicle with another obstacle.

Figure 5:
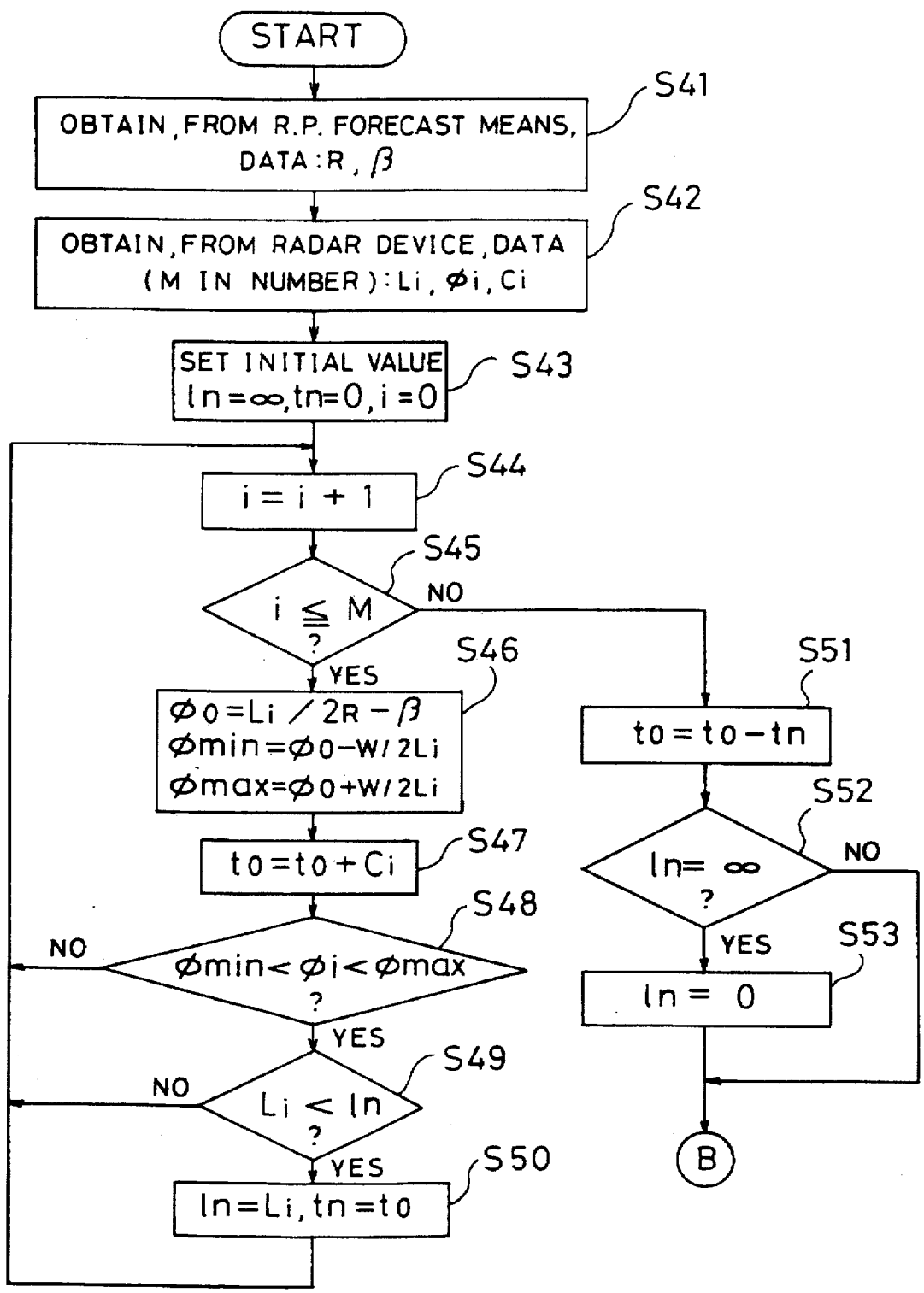
FIGS. 5 and 6 show a second embodiment of the present invention.
Figure 6:
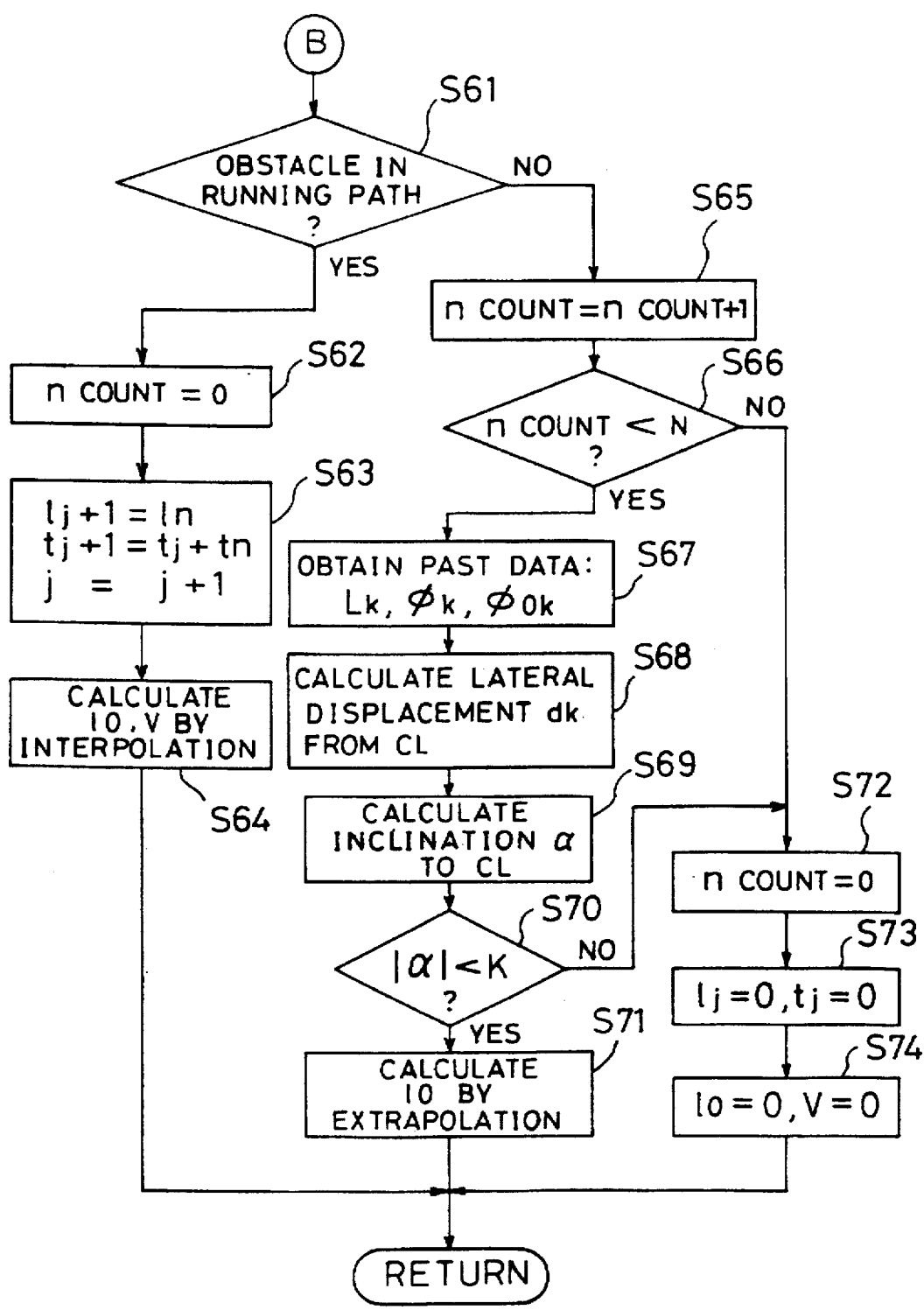

FIGS. 5 and 6 relate to a second embodiment of a vehicle run safety apparatus of the present invention. The figures are flow charts showing a modification of detection of relative position relation by the detection means 23 and restriction of presumption by the restriction means 24. The flow chart shown in FIG. 6 is successively executed after the flow chart shown in FIG. 5. In the second embodiment, since the basic construction of the vehicle run safety apparatus is the same as in the first embodiment, reference numerals shown in FIG. 1 are used for elements such as detection means and the like.

As shown in FIG. 5, when the sequence starts, there are obtained at a step S41 data (a curvature radius R of a running path and a side-slip angle β) from the running path forecast means 6. At a step S42, data is obtained from the radar device 3. The data of the radar device 3 is composed of data relating to M numbers of obstacles. Data of each obstacle has a distance Li (i means a number 1 to M) between the vehicle and an obstacle, a horizontal angle $\phi i$ of the obstacle from the center line of the radar device and no-echo counter Ci.

Then, at a step S43, initial values of in, tn and i are set to infinity, 0 and 0, respectively. After the initial values are set, i is counted up by 1 at a step S44. At a step S45, there is judged whether i is M and less. When the judgment is "YES", at a step S46, $\phi 0$, $\phi min$ and $\phi max$ are calculated according to respective following formulae:

$$\phi 0 = (Li/2R) - \beta,$$

$$\phi min = \phi 0 - (W/2Li),$$

$$\phi max = \phi 0 + (W/2Li).$$

In the above formulae, as shown in FIG. 4, $\phi 0$ is an included angle at which a straight line a2 connecting between the vehicle C and a center line CL of the running path forward by Li of the vehicle C meets a center line al of the vehicle; W is a road width of the running path (corresponding to the width of the center area A in the first example) and is set approximately equal to a width of the vehicle C; $\phi min$ and $\phi max$ are included angles at which respective straight lines connecting between the vehicle C and right and left end lines on the running path forward by Li of the vehicle C meet the center line al of the vehicle.

Then, at a step S47, no-echo counter Ci is added to a time t0 and the added value is newly set to t0. At a step S48, there is judged whether a horizontal angle $\phi i$ of an obstacle is between the above values $\phi min$ and $\phi max$, that is, whether the obstacle exists in the running path A. When the judgment is "YES", there is judged at a step S49 whether a distance Li between the obstacle in the running path and the vehicle is less than ln. When the judgment is "YES", the distance Li and the time t0 are set to in and tn respectively at a step S50 and then the sequence is returned to the step S44. The sequence is also returned to the step S44 when the judgment at the steps S48 or S49 is "NO".

By repeating the steps S44 to S50, there is discriminated a nearest obstacle to the vehicle C in the running path A out of M numbers of obstacles detected by the radar device 3 and the distance between the nearest obstacle and the vehicle is set to ln.

When the checking is complete with respect to all the data of M numbers of obstacles, a value in which tn has been lessened from t0 is newly set to t0 (=t0−tn) at a step S51. At a step S52, there is judged whether in is infinity, that is, whether in remains the value set initially. When ln remains the value, in is reset to 0 at a step S58 and the sequence is moved to FIG. 6. When ln is a finite value, the sequence is immediately moved to FIG. 6.

As shown in FIG. 6, there is judged at a step S61 whether an obstacle (a nearest obstacle) exists in the running path. When the judgment is "YES", n count is reset to 0 at a step S62, and various kinds of replacements are conducted to calculate a relative velocity at a step S63. At a step S64, there is calculated a distance 10 between the vehicle and the nearest obstacle at the present time by using interpolation such as a method of least square or the like and then there is calculated a relative velocity V between the vehicle and the nearest obstacle at the present time by using the distance 10. Then, the sequence is returned.

On the other hand, when the judgment at the step S61 is "NO", n count is counted up by 1 at a step S65, and there is judged at a step S66 whether n count is less than a set frequency N. Then, at a step S67, there are obtained past data relating to the nearest obstacle stored in the memory part 21. The data are obtained by retracing m times of frame scannings before the nearest obstacle is missed and the data have, with reference to each frame scanning, a distance Lk (k means a number 1 to m) between the vehicle C and the forward obstacle of the vehicle, a horizontal angle $\phi k$ of the obstacle from the center line of the radar device, and an included angle $\phi 0k$ at which a straight line connecting between the vehicle C and the center line CL of the running path in which the obstacle exists, meets a center line al of the vehicle.

When the data are obtained, there is calculated at a step S68, with reference to each frame scanning, a lateral displacement dk of the obstacle from the center line CL of the running path of the vehicle. The lateral displacement dk is calculated according to the following formula:

$$dk=Lk\cdot tan\ (\phi 0k-\phi k).$$

Then, there is calculated at a step S69 an inclination $\alpha$ at which a relative moving direction of the obstacle to the vehicle meets the center line CL of the running path, based on the lateral displacement dk at each frame scanning. At a step S70, there is judged whether the absolute value of the inclination $\alpha$ is less than a set value K. The set value K is a value set in order to avoid contact of the vehicle with the obstacle owing to the inclination $\alpha$, and a variable the parameters of which are a distance, a relative velocity and the like between the vehicle and the obstacle. When the judgment at the step S70 is "YES", that is, when there is a possibility of contact of the vehicle with the obstacle owing to the inclination $\alpha$, there is calculated at a step S71 a distance between the vehicle and the nearest obstacle at the present time based on the data obtained until the time by using extrapolation. Then, the sequence is returned.

When the judgment at the step S66 is "NO", that is, when n count is not less than a set frequency N, or when the judgment at the step S70 is "NO", that is, when there is no possibility of contact of the vehicle with the obstacle owing to the inclination $\alpha$, n count is reset to 0 at a step S72 and lj and tj are reset to 0 together at a step S73. At a step S74, the distance 10 and the relative velocity V between the vehicle and the nearest obstacle are reset to 0 together, and then the sequence is returned.

In the flow chart shown in FIG. 6, the steps S67, S68 and S69 show, in particular, detailed contents relating to detection of a relation of relative position by the detection means 23. At the steps, when the information of the obstacle is not outputted from the radar device 3, the detection means 23 detects whether the obstacle was moving toward the vehicle to contact with the vehicle before the time. The steps S70 to S74 show detailed contents for restricting presumption by the restriction means 24. At the steps, the restriction means 24 accepts presumption by the presumption means 22 when the obstacle was moving toward the vehicle to contact with the vehicle just before the information of the obstacle is not outputted, or prohibits, on the other hand, presumption by the presumption means 22 when the obstacle was not moving toward the vehicle to contact with the vehicle just before the information of the obstacle is not outputted.

The following will discuss the operation and effects of the second embodiment. When information of the obstacle is not outputted from the radar device 3, the detection means 23 calculates an inclination $\alpha$ of the obstacle to the center line of the running path, and then judges, based on the inclination $\alpha$, whether the obstacle was moving toward the vehicle to contact with the vehicle just before the non-output time of the obstacle information. When the obstacle was moving toward the vehicle to contact with the obstacle, according to information in the memory part 21 obtained until the non-output time of the obstacle information, the presumption means 22 keeps a present value of a relative velocity V between the vehicle and the obstacle a prior value and presumes a present value of a distance 10 between the vehicle and the obstacle. Then, the contact-possibility judgment means 12 judges a possibility of contact of the vehicle with the obstacle based on the information from the presumption means 22. When the possibility of contact exists, there are applied an alarm and an automatic braking thus avoiding the contact of the vehicle with the obstacle.

On the other hand, when there is judged that the obstacle was not moving toward the vehicle to contact with the vehicle in view of the inclination $\alpha$, presumption by the presumption means 22 is prohibited by the restriction means 24. Accordingly, in the contact-possibility judgment means 12, there cannot be made the judgment of the possibility of contact based on the information from the presumption means 22. This previously prevents unnecessary applications of an alarm and an automatic braking. Further, since the judgment of the possibility of contact with the obstacle is suspended at a presumption stage, the contact-possibility judgment means 12 can judge a possibility of contact with another obstacle.

Figure 7:
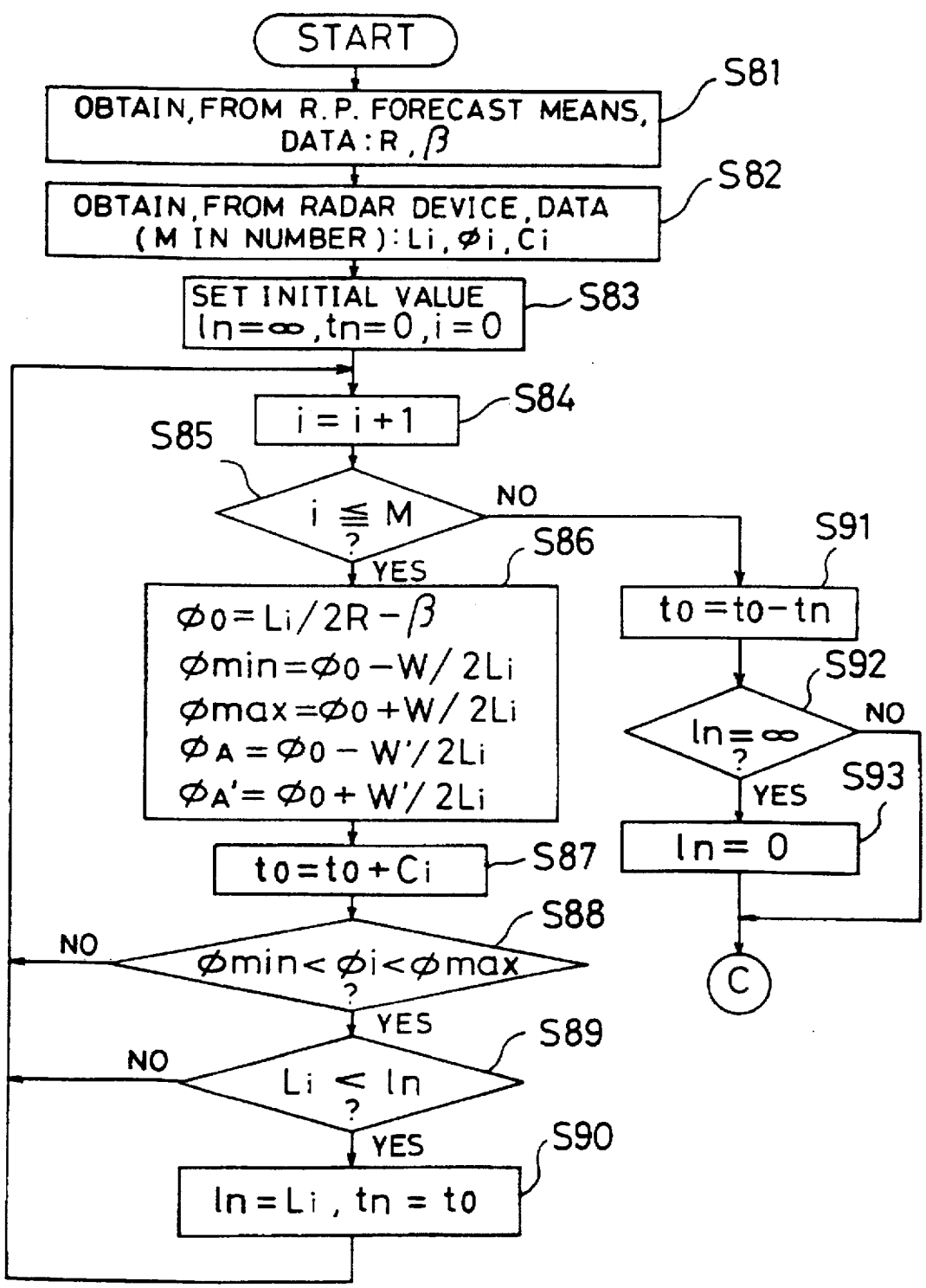
FIGS. 7 and 8 show a third embodiment of the present invention.
Figure 8:
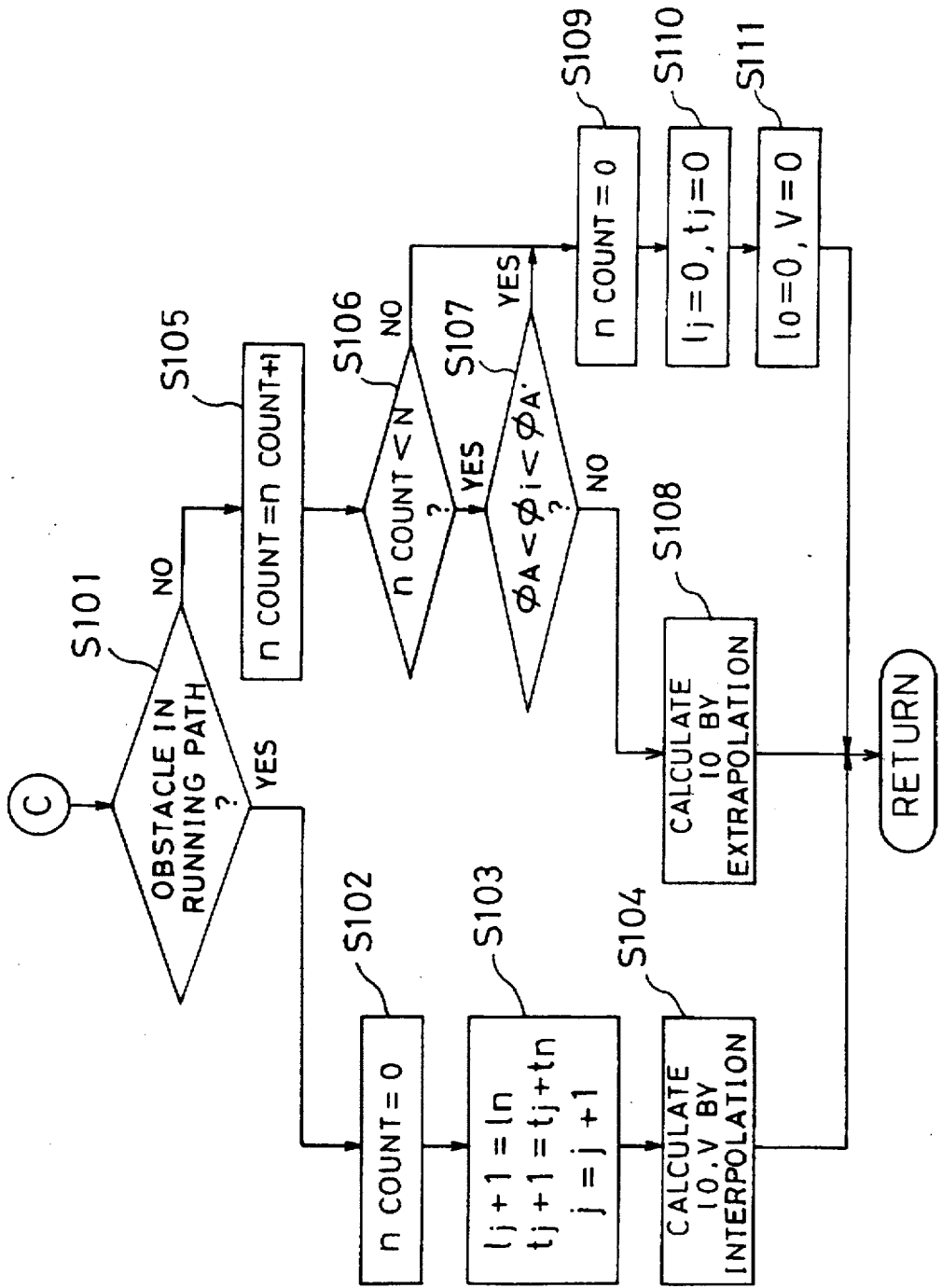

FIGS. 7 and 8 relate to a third embodiment of a vehicle run safety apparatus of the present invention. The figures are flow charts showing another modification of detection of relative position relation by the detection means 23 and restriction of presumption by the restriction means 24. Here, the flow chart shown in FIG. 8 is successively executed after the flow chart shown in FIG. 7. In the third embodiment, since the basic construction of the vehicle run safety apparatus is the same as in the first embodiment, reference numerals shown in FIG. 1 are used for elements such as detection means and the like.

As shown in FIG. 7, when the sequence starts, there are obtained at a step S81 data (a curvature radius R of a running path and a side-slip angle $\beta$) from the running path forecast means 6. At a step S82, data is obtained from the radar device 3. The data of the radar device 3 is composed of data relating to M numbers of obstacles. Data of each obstacle has a distance Li (i means a number 1 to M) between the vehicle and an obstacle, a horizontal angle $\phi i$ of the obstacle from the center line of the radar device and no-echo counter Ci.

Then, at a step S83, initial values of ln, tn and i are set to infinity, 0 and 0, respectively. After the initial values are set, i is counted up by 1 at a step S84. At a step S85, there is judged whether i is M and less. When the judgment is "YES", at a step S86, $\phi 0$, $\phi min$, $\phi max$, $\phi A$ and $\phi A'$ are calculated according to respective following formulae:

$$\phi 0=(Li/2R)-\beta,$$

$$\phi min=\phi 0-(W/2Li),$$

$$\phi max=\phi 0+(W/2Li),$$

$$\phi A=\phi 0-(W'/2Li),$$

$$\phi A'=\phi 0+(W'/2Li).$$

In the above formulae, as shown in FIG. 4, $\phi 0$ is an included angle at which a straight line a2 connecting between the vehicle C and a center line CL of the running path forward by Li of the vehicle C meets a center line a1 of the vehicle (a center line of the radar device 3); W indicates a road width of the running path (corresponding to the width of the center area A in the first embodiment) and is set approximately equal to a width of the vehicle C; W' is a width of an enlarged area along the center line CL of the running path, the width being set larger than the road width W of the running path (corresponding to the width of the edge areas B in the first embodiment); φmin and φmax are included angles at which respective straight lines connecting between the vehicle C and right and left end lines (border lines shown in solid lines) on the running path forward by Li of the vehicle C meet the center line a1 of the vehicle; and φA and φA' are included angles at which respective straight lines connecting between the vehicle C and right and left end lines of the enlarged area (border lines shown in broken lines) on the running path forward by Li of the vehicle C meet the center line a1 of the vehicle.

Then, at a step S87, no-echo counter Ci is added to a time t0 and the added value is newly set to t0. At a step S88, there is judged whether a horizontal angle φi of an obstacle is between the above values φmin and φmax, that is, whether the obstacle exists in the running path A. At a step S89, there is judged whether a distance Li between the obstacle in the running path and the vehicle is less than ln. When the judgment is "YES", the distance Li and the time t0 are set to ln and tn respectively at a step S90 and then the sequence is returned to the step S84. The sequence is also retuned to the step S84 when the judgment at the steps S88 or S89 is "NO".

By repeating the steps S84 to S90, there is discriminated a nearest obstacle to the vehicle C in the running path A out of M numbers of obstacles detected by the radar device 3 and the distance between the nearest obstacle and the vehicle is set to ln.

When the checking is complete with respect to all the data of M numbers of obstacles, a value in which tn has been lessened from t0 is newly set to t0 (=t0−tn) at a step S91. Then, at a step S92, there is judged whether ln is infinity, that is, whether ln remains the value set initially. When ln remains the value, ln is reset to 0 at a step S93 and the sequence is moved to FIG. 8. When ln is a finite value, the sequence is immediately moved to FIG. 8.

As shown in FIG. 8, there is judged at a step S101 whether an obstacle (a nearest obstacle) exists in the running path A. When the judgment is "YES", n count is reset to 0 at a step S102 and various kinds of replacements are conducted to calculate a relative velocity at a step S103. At a step S104, there is calculated a distance 10 between the vehicle and the nearest obstacle at the present time by using interpolation such as a method of least square or the like and then there is calculated a relative velocity V between the vehicle and the nearest obstacle at the present time by using the distance 10. Then, the sequence is returned.

On the other hand, when the judgment at the step S101 is "NO", n count is counted up by 1 at a step S105 and then there is judged at a step S106 whether n count is less than a set frequency N. When the judgment is "YES", there is judged at a step S107 whether a horizontal angle φi of the obstacle is between the above values φA and φA', that is, whether the obstacle exists in the enlarged area B. When no obstacle exists in the enlarged area B, there is calculated at a step S108 a distance 10 between the vehicle and the nearest obstacle at the present time based on the data obtained until the time by using extrapolation. Then, the sequence is returned.

When the judgment at the step S106 is "NO", that is, when n count is not less than the set frequency N, or when the judgment at the step S107 is "YES", that is, when the obstacle exists in the enlarged area B, n count is reset to 0 at a step S109 and lj and tj are reset to 0 together at a step S110. At a step 111, the distance 10 and the relative velocity V between the vehicle and the nearest obstacle are reset to 0 together, and then the sequence is returned.

Out of a series of flow charts shown in FIGS. 7 and 8, the steps S86 and S107 show, in particular, detailed contents relating to detection of a relation of relative position by the detection means 23. At the steps, when the information of an obstacle is not outputted from the radar device 3, the detection means 23 enlarges right and left an area to be detected by the radar device 3 and detects whether the obstacle exists in the enlarged area B. The steps S107 to 111 show detailed contents for restricting presumption by the restriction means 24. At the steps, the restriction means 24 accepts presumption by the presumption means 22 when no obstacle exists in the enlarged area B at the non-output time of the obstacle information, or prohibits, on the other hand, presumption by the presumption means 23 when the obstacle exists in the enlarged area B at the non-output time of the obstacle information.

The following will discuss the operation and effects of the above-mentioned third embodiment. When the information of an obstacle is not outputted from the radar device 3, the detection means 23 enlarges right and left an area to be detected by the radar device 3 and judges whether the obstacle exists in the enlarged area B. When no obstacle exists in the enlarged area B, the obstacle may still exist in the running path A of the vehicle. Therefore, according to information in the memory part 21 obtained until the non-output time of the obstacle information, the presumption means 22 keeps a present value of a relative velocity V between the vehicle and the obstacle a prior value and presumes a present value of a distance 10 between the vehicle and the obstacle. Then, the contact-possibility judgment means 12 judges a possibility of contact of the vehicle with the obstacle based on the information from the presumption means 22. When the possibility of contact exists, there are applied an alarm and an automatic braking thus avoiding the contact of the vehicle with the obstacle.

On the other hand, when the obstacle exists in the enlarged area B, this means that the obstacle has already moved outward of the running path A of the vehicle. In this case, presumption by the presumption means 22 is prohibited by the restriction means 24. Accordingly, in the contact-possibility judgment means 12, there cannot be made the judgment of the possibility of contact based on the information from the presumption means 22. This previously prevents unnecessary applications of an alarm and an automatic braking. Further, since the judgment of the possibility of contact with the obstacle is suspended at a presumption stage, the contact-possibility judgment means 12 can judge a possibility of contact with another obstacle.

Figure 9:
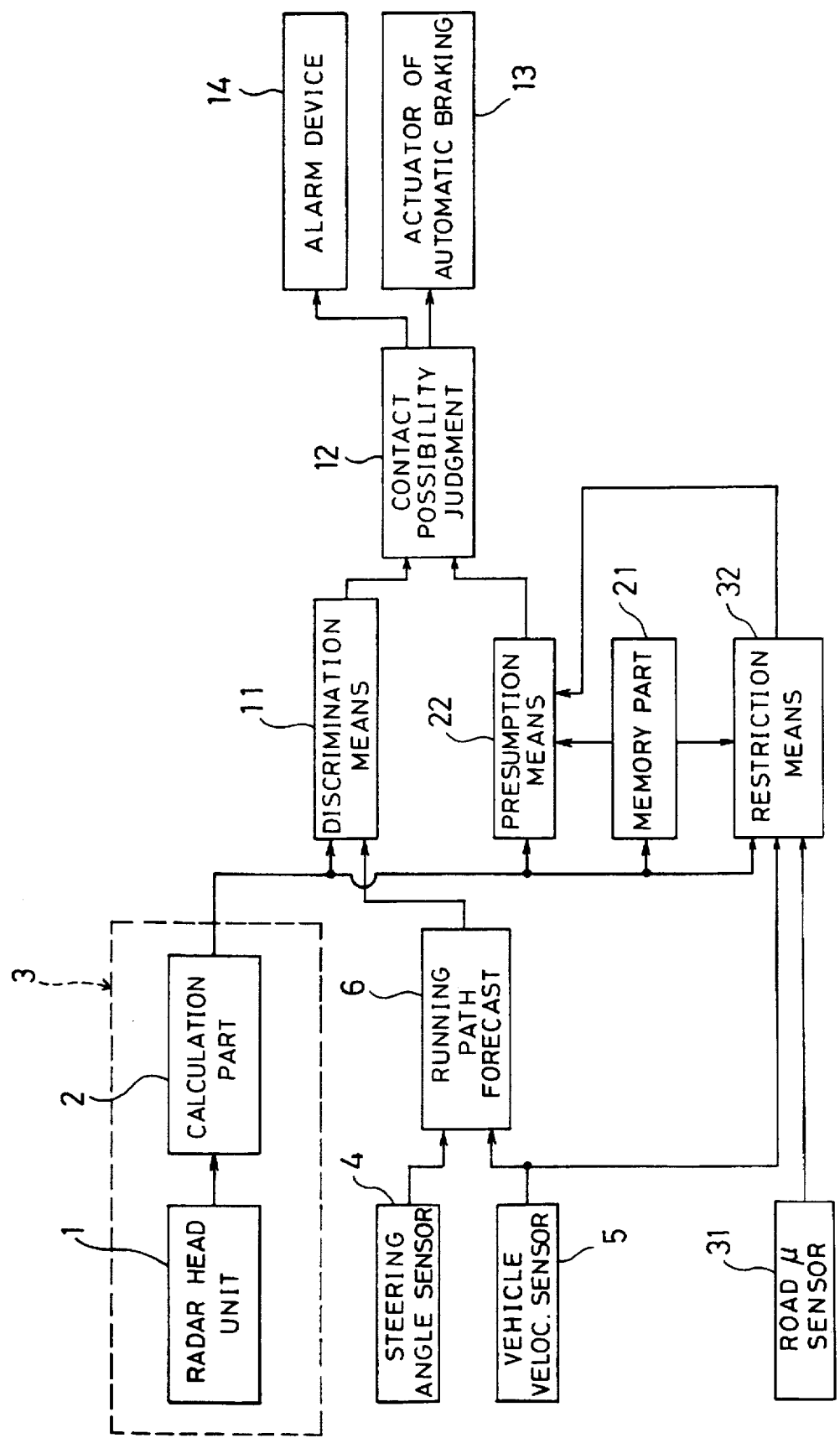
FIGS. 9, 10 and 11 show a fourth embodiment of the present invention.

FIG. 9 is a block diagram showing an arrangement of a fourth embodiment of a vehicle run safety apparatus according to the present invention. In the fourth embodiment, as in the first embodiment, the vehicle run safety apparatus comprises: a scan-type radar device 3 composed of a radar head unit 1 and a calculation part 2; a steering angle sensor 4; a vehicle velocity sensor 5; running path forecast means 6 for forecasting a running path of a vehicle; discrimination means 11 for discriminating a nearest obstacle existing in an area along the running path; contact-possibility judgment means 12 for judging a possibility of contact of the vehicle with the nearest obstacle; an automatic braking device (an actuator thereof) 13; an alarm device 14; a memory part 21 for memorizing, for a set period, information of obstacles outputted from the radar device 3 (calculation part 2); and presumption means 22 for successively presuming, when information of the obstacle is not outputted from the radar device 3, a present value of a distance between the vehicle and the obstacle for a set time based on the information of the obstacle in the memory part 21 obtained until the time.

The vehicle run safety apparatus of the fourth embodiment is different, from that of the first embodiment, in the following matters: the apparatus of the fourth embodiment does not have detection means 23 in the first embodiment; the apparatus has a road μ sensor 31 for detecting a friction coefficient μ of a road surface on which the vehicle runs; and there is different, from the first embodiment, in the contents of restriction in the restriction means 32 for restricting presumption by the presumption means 22 according to a situation at the time when information of an obstacle is not outputted from the radar device 3. The restriction means 32 receives signals from the radar device 3, the memory part 21, the vehicle velocity sensor 5 and the road μ sensor 81.

Figure 10:
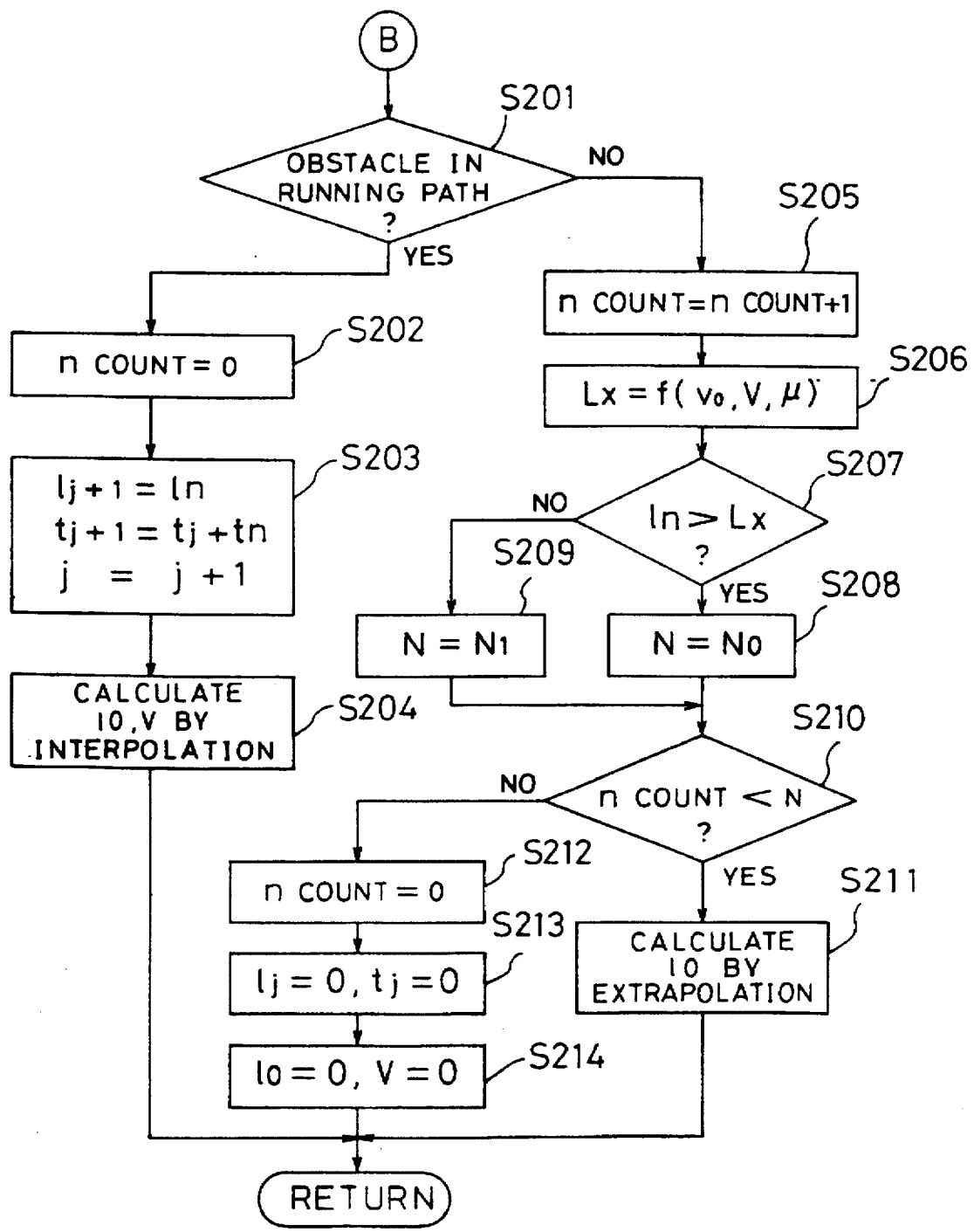
Figure 11A:
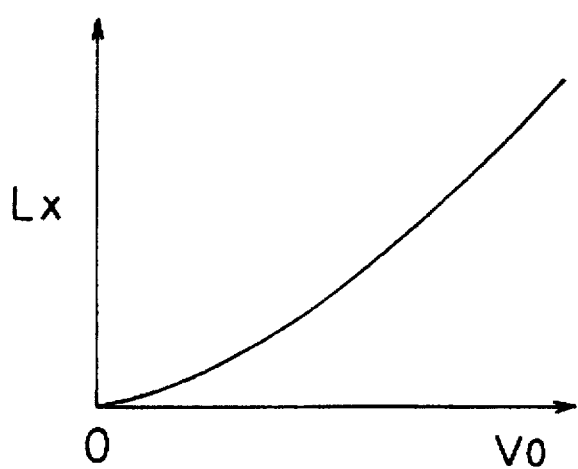
FIGS. 11(a), (b), (c) shows a correlation between a threshold value Lx and a vehicle velocity v0, a correlation between a threshold value Lx and a relative velocity V, and a correlation between a threshold value Lx and a road friction coefficient μ.
Figure 11B:
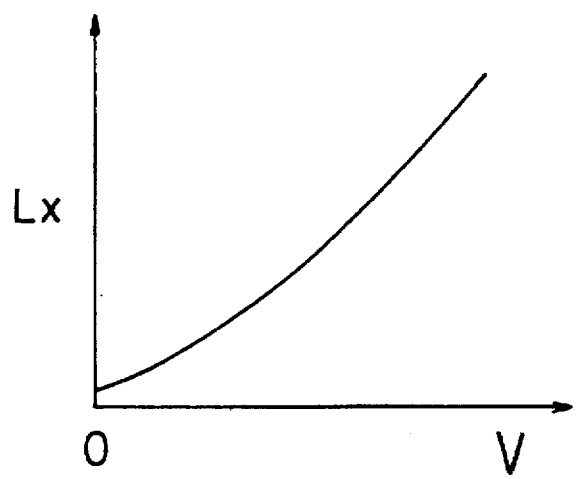
Figure 11C:
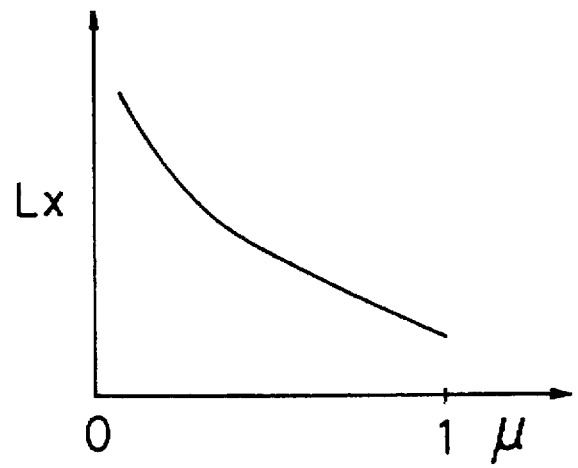

The following will discuss in detail the contents of presumption by the presumption means 22 and restriction by the restriction means 32, with reference to a flow chart shown in FIG. 10. The flow chart in FIG. 10 is successively executed after the flow chart in FIG. 5 for discrimination of a nearest obstacle by the discrimination means 11, the flow chart in FIG. 5 being mentioned above in the second embodiment of this invention.

As shown in FIG. 10, there is judged at a step S201 whether a nearest obstacle exists in a running path of a vehicle. When the judgment is "YES", n count is reset to 0 at a step S202 and various kinds of replacements are conducted to calculate a relative velocity at a step S203. At a step S204, there is calculated a distance 10 between the vehicle and the nearest obstacle at the present time (that is, the present value of the distance) by using interpolation such as a method of least square or the like and then there is calculated a relative velocity V between the vehicle and the nearest obstacle at the present time by using the distance 10. Then, the sequence is returned.

On the other hand, when the judgment at the step S201 is "NO", n count is counted up by 1 at a step S205 and then a threshold value Lx is set at a step S206. The threshold value Lx is a function value the parameters of which are a vehicle velocity of the vehicle v0, a relative velocity V between the vehicle and the nearest obstacle and a friction coefficient μ of a road surface on which the vehicle runs (Lx=f(v0, V, μ)). Further, as shown in FIGS. 5(a), (b), (c), the value Lx is so set that as the vehicle velocity v0 or the relative velocity V is larger, or as the friction coefficient μ comes closer from 1 to 0, the threshold value Lx comes greater.

Then, at a step S207, there is judged whether the distance in between the vehicle and the obstacle at the time just before the nearest obstacle in the running path is missed (that is, just before the obstacle information is not outputted from the radar device 3) is greater than the threshold value Lx. When the judgment is "YES", at a step S208, NO is set to an N value for setting the below-mentioned duration of the presumption. When the judgment is "NO", N1 is set to the value N at a step S209. Here, NO is greater than N1. Accordingly, when the distance in between the vehicle and the nearest obstacle at the time just before the obstacle is missed is greater than the threshold value Lx, the duration of the presumption is changed longer than that when the distance in is not greater than the threshold value Lx, at the steps S206 to S209. This change is executed by the restriction means 32.

After the value N is set, there is judged whether n count is less than the value N at a step S210. When the judgment is "YES", there is calculated at a step S211 a distance 10 between the vehicle and the nearest obstacle at the present time based on the data obtained until the time by using extrapolation. The present value of the distance 10 is presumed by using the distance in and the relative velocity V between the vehicle and the nearest obstacle at the time just before the obstacle is missed, according to the following formula:

$$l0 = ln + V \cdot T.$$

In the above formula, T is a passed time since the nearest obstacle was missed.

The presumption of the distance 10 is executed by the presumption means 22. After the presumption, the sequence is returned.

When the judgment at the step S210 is "NO", n count is reset to 0 at a step S212 and lj and t j are reset to 0 together at a step S213. At a step S214, the distance 10 and the relative velocity V between the vehicle and the nearest obstacle are reset to 0 together, and then the sequence is returned.

The following will discuss the operation and effects of the fourth embodiment. When information of an obstacle is not outputted from the radar device 3, according to Information in the memory part 21 obtained until the non-output time of the obstacle information, the presumption means 22 keeps a present value of a relative velocity V between the vehicle and the obstacle a prior value and successively presumes a present value of a distance 10 between the vehicle and the obstacle for a set time. Then, the contact-possibility judgment means 12 judges a possibility of contact of the vehicle with the obstacle based on the information from the presumption means 22. When the possibility of contact exists, the contact-possibility judgment means 12 applies an alarm and an automatic braking as measures for avoiding the contact. Thus, there can be avolded the contact of the vehicle with the obstacle.

In the above case, the duration of the presumption by the presumption means 22 is changed, by the restriction means 32, according to the distance In between the obstacle and the vehicle at the time just before the obstacle information is not outputted. In detail, when the distance in is greater than the threshold value Lx, the duration of the presumption is longer than that when the distance In is not greater than the threshold value Lx. Therefore, as for an obstacle existing relatively far from the vehicle, presumption is continued for a relatively long time thus enhancing the effect of presumption. As for an obstacle relatively close to the vehicle, presumption is continued for a relatively short time thus avoiding mis-operations of an alarm, an automatic braking and the like due to an error of presumption. Further, the threshold value Lx is a function value the parameters of which are elements relating to a braking distance of a vehicle, i.e., a vehicle velocity v0, a relative velocity V and a friction coefficient μ of a road surface on which the vehicle runs. As the vehicle velocity v0 or the relative velocity V is greater or as the friction coefficient μ is closer to 0, that is, as the vehicle is under conditions that the braking distance is longer, the threshold value Lx comes greater. Accordingly, presumption can be executed more appropriately by changing the duration of the presumption.

In the fourth embodiment, the duration of the presumption by the presumption means 11 is changed at two stages according as the distance in between the obstacle and the vehicle at the time just before the obstacle information is not outputted from the radar device 8 is greater than the set threshold value Lx or not. However, the duration of the presumption can be changed at more than three stages or continuously. In other words, it is preferable that as the distance in between the obstacle and the vehicle at the time just before the obstacle information is not outputted from the radar device 8 is longer, the duration of the presumption by the presumption means 11 is changed longer.

Further, in the fourth embodiment, the duration of the presumption is changed according to the distance in between the obstacle and the vehicle at the time just before the obstacle information is not outputted from the radar device 3. In the present invention, however, the duration of the presumption can be changed according to congested traffic conditions or the like on the road at the time when the obstacle information is not outputted from the radar device 3.

Figure 12:
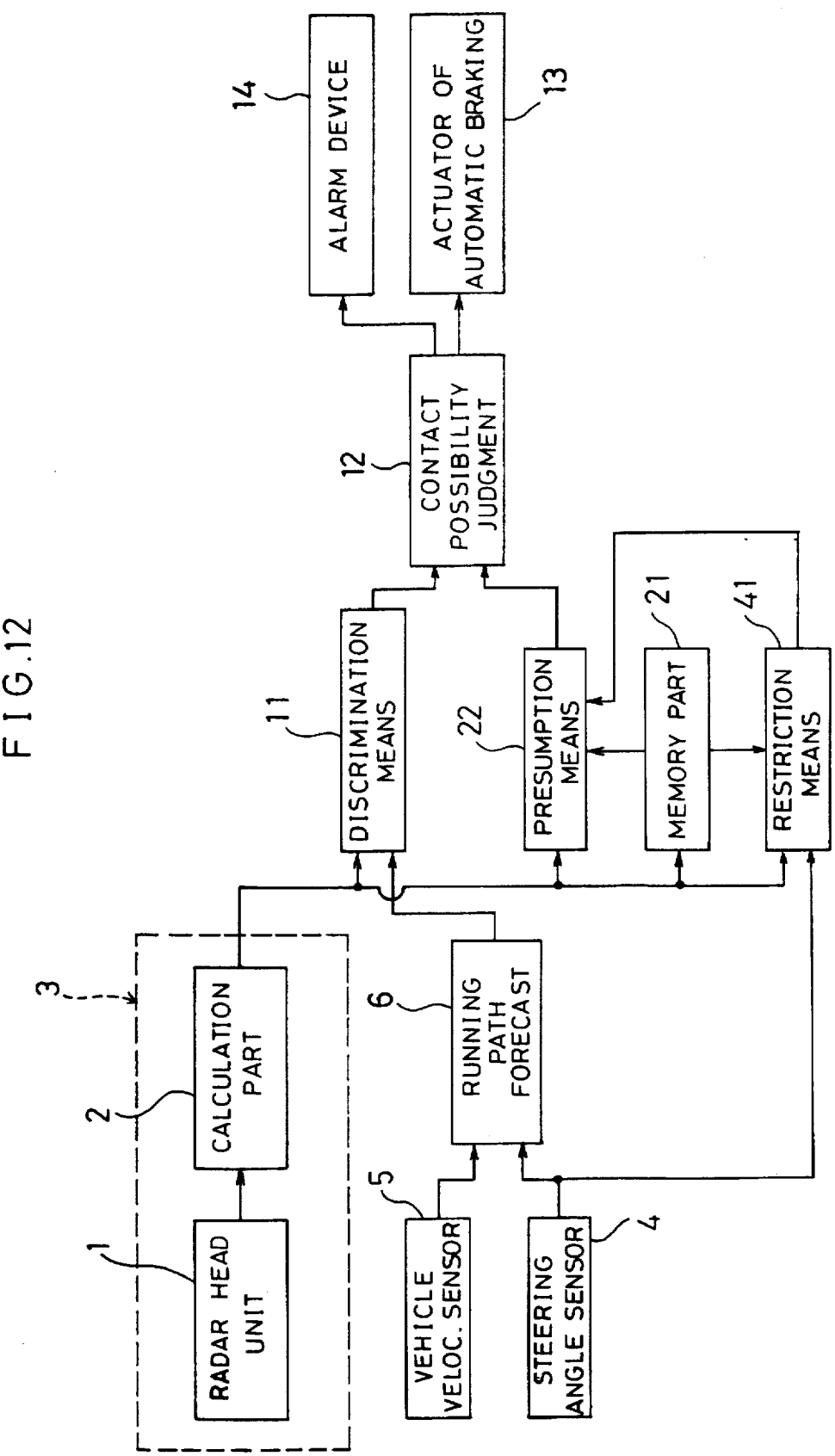
FIGS. 12 and 13 show a fifth embodiment of the present invention.

FIG. 12 is a block diagram showing an arrangement of a fifth embodiment of a vehicle run safety apparatus according to the present invention. In the fifth embodiment, as in the first embodiment, the vehicle run safety apparatus comprises: a scan-type radar device 8 composed of a radar head unit 1 and a calculation part 2; a steering angle sensor 4; a vehicle velocity sensor 5; running path forecast means 6 for forecasting a running path of a vehicle; discrimination means 11 for discriminating a nearest obstacle existing in an area along the running path; contact-possibility judgment means 12 for judging a possibility of contact of the vehicle with the nearest obstacle; an automatic braking device (an actuator thereof) 13; an alarm device 14; a memory part 21 for memorizing, for a set period, information of obstacles outputted from the radar device 3 (the calculation part 2); and presumption means 22 for successively presuming, when information of the obstacle is not outputted from the radar device 3, a present value of a distance between the vehicle and the obstacle for a set time based on the information of the obstacle in the memory part 21 obtained until the time.

The vehicle run safety apparatus of the fifth embodiment is different, from that of the first embodiment, in the following matters: the apparatus of the fifth embodiment does not have detection means 23 in the first embodiment; and there is different, from the first embodiment, in the contents of restriction in the restriction means 41 for restricting presumption by the presumption means 22 according to a situation at the time when information of an obstacle is not outputted from the radar device 3. The restriction means 41 receives signals from the radar device 3, the memory part 21 and the steering angle sensor 4. The steering angle sensor 4 has functions as steering-time detection means for detecting a steering time of the vehicle.

Figure 13:
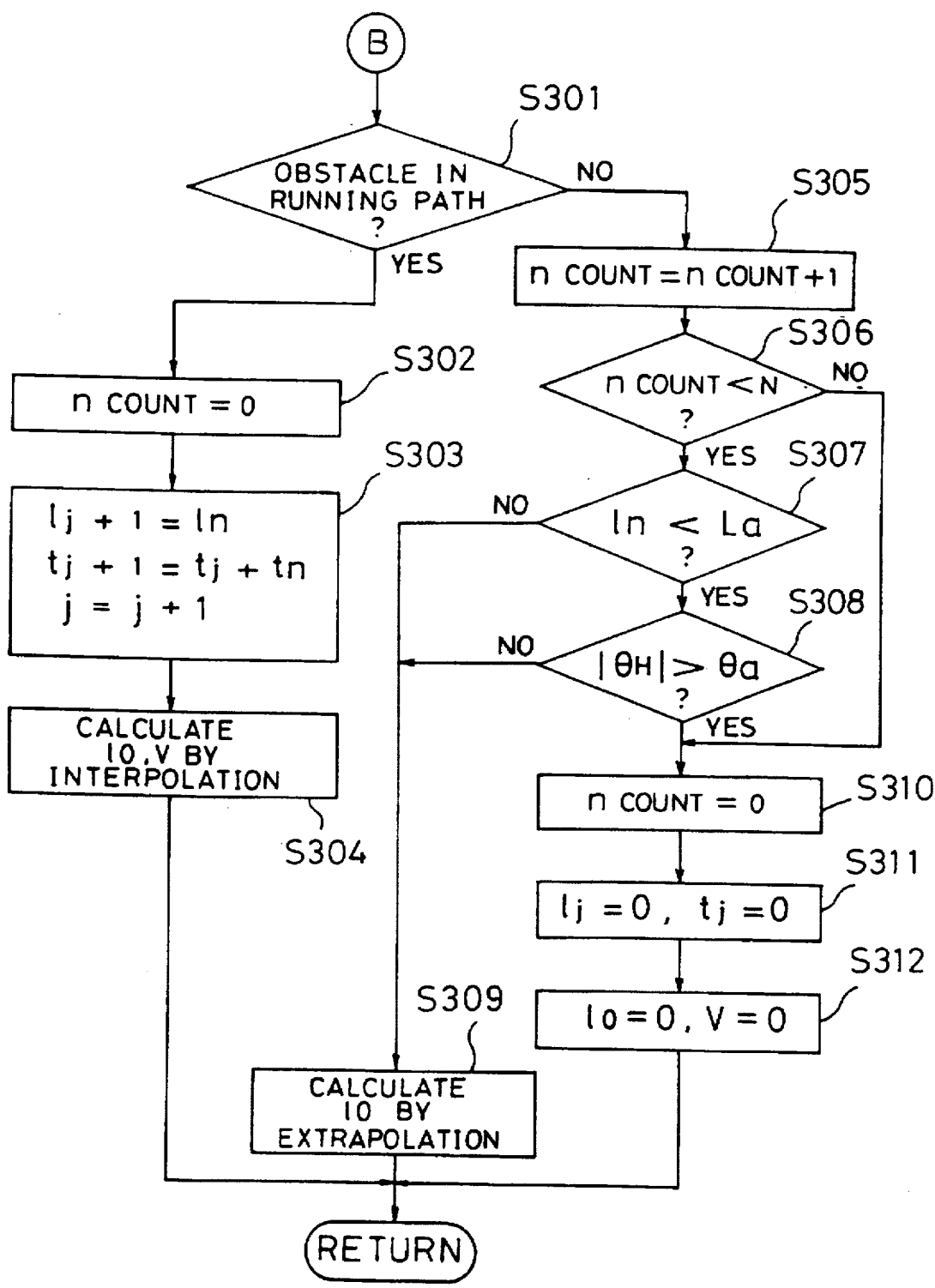

The following will discuss in detail the contents of presumption by the presumption means 22 and restriction by the restriction means 41, with reference to a flow chart shown in FIG. 13. The flow chart in FIG. 13 is successively executed after the flow chart in FIG. 5 for discrimination of a nearest obstacle by the discrimination means 11, the flow chart in FIG. 5 being mentioned above in the second embodiment of this invention.

As shown in FIG. 13, there is judged at a step S301 whether a nearest obstacle exists in a running path of a vehicle. When the judgment is "YES", n count is reset to 0 at a step S302 and various kinds of replacements are conducted to calculate a relative velocity at a step S303. At a step S304, there is calculated a distance 10 between the vehicle and the nearest obstacle at the present time (that is, the present value of the distance) by using interpolation such as a method of least square or the like and then there is calculated a relative velocity V between the vehicle and the nearest obstacle at the present time by using the distance 10. Then, the sequence is returned.

On the other hand, when the judgment at the step S301 is "NO", n count is counted up by 1 at a step S305, there is judged at a step S306 whether n count is less than a set frequency N. When the judgment is "YES", there is judged at a step S307 whether the distance in between the obstacle and the vehicle at the time just before the nearest obstacle in the running path is missed (that is, just before the obstacle information is not outputted from the radar device 3) is less than a set distance La. At a step S308, based on signals from the steering angle sensor 4, there are judged whether the absolute value of a steering angle θH is more than a set value θa and the vehicle is steered. When either of the judgments at the steps S307 and S308 is "NO", there is calculated at a step S309 a distance 10 between the vehicle and the nearest obstacle at the present time based on the data obtained until the time by using extrapolation. The present value of the distance 10 is presumed by using the distance in and the relative velocity V between the vehicle and the nearest obstacle at the time just before the obstacle is missed according to the following formula:

10=ln+V·T.

In the above formula, T is a passed time since the nearest obstacle was missed.

The presumption of the distance 10 is executed by the presumption means 22. After the presumption, the sequence is returned.

When the judgment at the step S306 is "NO", that is, when a set time has passed since the nearest obstacle was missed, or when both of the judgments at the steps S307 and S308 are "YES", that is, when the vehicle is steered in case that the vehicle has come close to the obstacle before missed, n count is reset to 0 at a step S310 and lj and tj are reset to 0 together at a step S311. At a step S312, the distance 10 and the relative velocity V between the vehicle and the nearest obstacle are reset to 0 together, and then the sequence is returned. Each of the judgments at the steps S306, S307 and S308 is executed by the restriction means 41. The restriction means 41 is so composed as to prohibit the presumption of the distance 10 by the presumption means 22 when the set time has passed since the nearest obstacle was missed or when the vehicle is steered in case that the vehicle has come close to the obstacle before missed.

The following will discuss the operation and effects of the fifth embodiment. When information of an obstacle is not outputted from the radar device 3, the restriction means 41 verifies whether a set time has passed since the nearest obstacle was missed and judges whether the vehicle is steered in case that the vehicle has come close to the obstacle before missed. In the negative, according to the information in the memory part 21 obtained until the non-output time of the obstacle information, the presumption means 22 keeps a present value of a relative velocity V between the vehicle and the obstacle a prior value and successively presumes a present value of a distance 10 between the vehicle and the obstacle for a set time. Then, the contact-possibility judgment means 12 judges a possibility of contact of the vehicle with the obstacle based on the information from the presumption means 22. When the possibility of contact exists, the contact-possibility judgment means 12 applies an alarm and an automatic braking as measures for avoiding the contact. Thus, there can be avoided the contact of the vehicle with the obstacle.

When the vehicle comes close to an obstacle, the driver himself may steer the vehicle so as to avoid the contact with the obstacle. In this case, when information of the obstacle is not outputted from the radar device 3, presumption by the presumption means 22 is prohibited by the restriction means 41. Thus, there cannot be made the judgment of the possibility of contact by the contact-possibility judgment means 12 based on the information from the presumption means 22. Accordingly, an automatic braking is prevented so that the steering by the driver as a measure of avoiding the contact is not interfered. In addition, it is prevented that an alarm frequently generates.

In the fifth embodiment, there is detected the steering time when the vehicle is steered, based on a steering angle θH. However, the steering time can be detected based on a steering angle velocity (d θH/dt), in stead of the steering angle θH or together with the steering angle θH.

Figure 14:
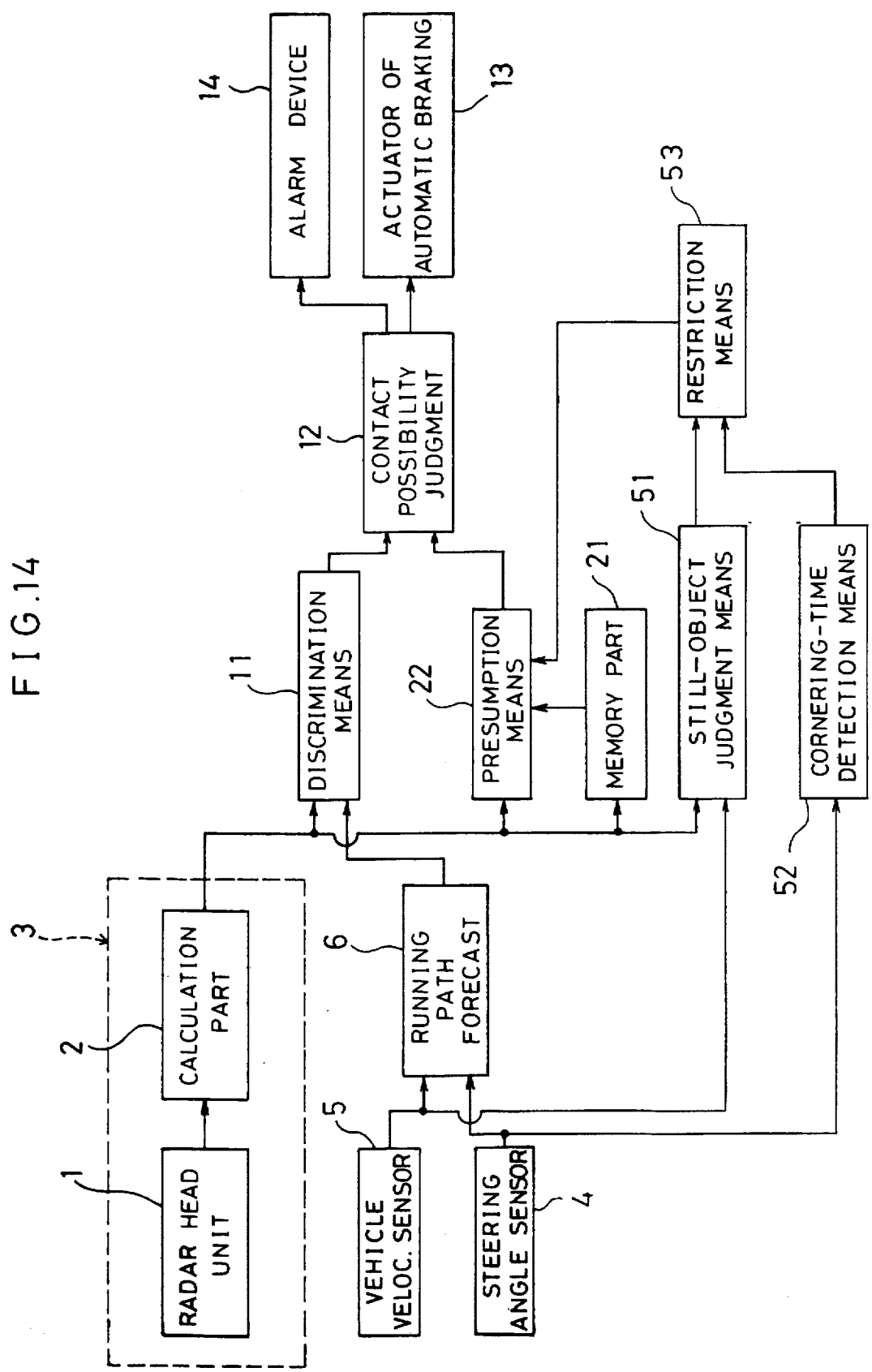
FIGS. 14 and 15 show a sixth embodiment of the present invention.

FIG. 14 is a block diagram showing an arrangement of a sixth embodiment of a vehicle run safety apparatus according to the present invention. In the sixth embodiment, as in the first embodiment, the vehicle run safety apparatus comprises: a scan-type radar device 3 composed of a radar head unit 1 and a calculation part 2; a steering angle sensor 4; a vehicle velocity sensor 5; running path forecast means 6 for forecasting a running path of a vehicle; discrimination means 11 for discriminating a nearest obstacle existing in an area along the running path; contact-possibility judgment means 12 for judging a possibility of contact of the vehicle with the nearest obstacle; an automatic braking device (an actuator thereof) 13; an alarm device 14; a memory part 21 for memorizing, for a set period, information of obstacles outputted from the radar device 3 (the calculation part 2); and presumption means 22 for successively presuming, when information of the obstacle is not outputted from the radar device 3, a present value of a distance between the vehicle and the obstacle for a set time based on the information of the obstacle in the memory part 21 obtained until the time.

The vehicle run safety apparatus of the sixth embodiment is different, from that of the first embodiment, in the following matters: the apparatus of the sixth embodiment does not have detection means 23 in the first embodiment; the apparatus of the sixth embodiment has still-object judgment means 51 and cornering-time detection means 52; and there is different, from the first embodiment, in the contents of restriction in the restriction means 53 for restricting presumption by the presumption means 22 according to a situation at the time when information of an obstacle is not outputted from the radar device 3. The still-object judgment means 51 receives signals from the radar device 3 and the vehicle velocity sensor 5 and judges whether the obstacle is a still object based on differences between a vehicle velocity and a relative velocity of the vehicle to the obstacle detected by the radar device 3. The cornering-time detection means 52 calculates a steering angle velocity by differentiating a steering angle detected by the steering angle sensor 4 once and detects the time when the vehicle is to enter in a corner based on the steering angle velocity. The restriction means 53 receives signals from the still-object judgment means 51 and the cornering-time detection means 52.

Figure 15:
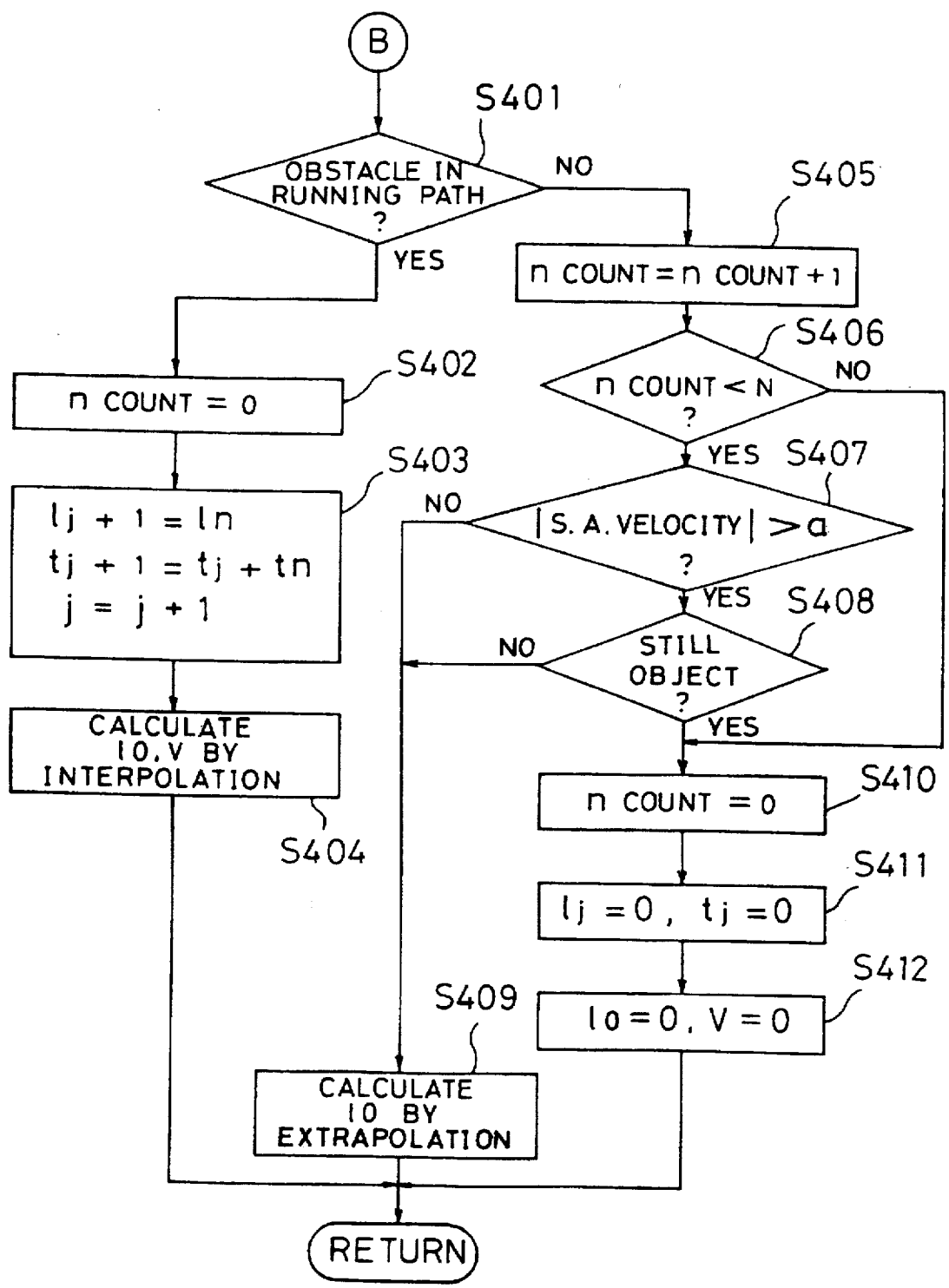

The following will discuss in detail the contents of presumption by the presumption means 22 and restriction by the restriction means 53, with reference to a flow chart shown in FIG. 15. The flow chart in FIG. 15 is successively executed after the flow chart in FIG. 5 for discrimination of a nearest obstacle by the discrimination means 11, the flow chart in FIG. 5 being mentioned above in the second embodiment of this invention.

As shown in FIG. 15, there is judged at a step S401 whether a nearest obstacle exists in a running path of a vehicle. When the judgment is "YES", n count is reset to 0 at a step S402 and various kinds of replacements are conducted to calculate a relative velocity at a step S403. At a step S404, there is calculated a distance 10 between the vehicle and the nearest obstacle at the present time (that is, the present value of the distance) by using interpolation such as a method of least square or the like and then there is calculated a relative velocity V between the vehicle and the nearest obstacle at the present time by using the distance 10. Then, the sequence is returned.

On the other hand, when the judgment at the step S401 is "NO", n count is counted up by 1 at a step S405, there is judged at a step S406 whether n count is less than a set frequency N. When the judgment is "YES", there are judged at a step S407 whether the absolute value of a steering angle velocity is more than a set value a and whether the vehicle is steered or the vehicle enters in a corner. At a step S408, there is judged whether the nearest obstacle in the running path at the time just before missed (that is, just before information of the obstacle is not outputted from the radar device 3) is a still object. When either of the above judgements at the steps S407 and S408 is "NO", there is calculated at a step S409 a distance 10 between the vehicle and the nearest obstacle at the present time based on the data obtained until the time by using extrapolation. The present value of the distance 10 is presumed by using the distance in and the relative velocity V between the vehicle and the nearest obstacle at the time just before the obstacle is missed, according to the following formula:

$$10=ln+V \cdot T.$$

In the above formula, T is a passed time since the nearest obstacle was missed.

The presumption of the distance 10 is executed by the presumption means 22. After the presumption, the sequence is returned.

When the judgment at the step S406 is "NO", that is, when a set time has passed since the nearest obstacle was missed, or when both of the judgments at the steps S407 and S408 are "YES", that is, when the vehicle enters in a corner and the missed nearest obstacle is a still object, n count is reset to 0 at a step S410 and lj and tj are reset to 0 together at a step S411. At a step S412, the distance 10 and the relative velocity V between the vehicle and the nearest obstacle are reset to 0 together, and then the sequence is returned. Each of the judgments at the steps S406, S407 and S408 is executed by the restriction means 53. The restriction means 53 is so composed as to prohibit the presumption of the distance 10 by the presumption means 22 when the set time has passed since the nearest obstacle was missed or when the vehicle enters in a corner and the nearest obstacle is a still object at the time when the nearest obstacle is missed.

The following will discuss the operation and effects of the sixth embodiment. When information of an obstacle is not outputted from the radar device 3, the restriction means 53 verifies whether a set time has passed since the nearest obstacle was missed and judges whether the vehicle enters in a corner at the time when the obstacle is missed and the missed obstacle is a still object, i.e., a reflector of a guardrail at a corner. In the negative, according to the information in the memory part 21 obtained until the non-output time of the obstacle information, the presumption means 22 keeps a present value of a relative velocity V between the vehicle and the obstacle a prior value and successively presumes a present value of a distance 10 between the vehicle and the obstacle for a set time. Then, the contact-possibility judgment means 12 judges a possibility of contact of the vehicle with the obstacle based on the information from the presumption means 22. When the possibility of contact exists, the contact-possibility judgment means 12 applies an alarm and an automatic braking as measures for avoiding the contact. Thus, there can be avoided the contact of the vehicle with the obstacle.

When the vehicle enters into a road corner, a guardrail at the road corner is recognized as an obstacle because the reflector attached to the guardrail reflects radar waves transmitted from the radar device 3. However, since the guardrail relatively moves outward of an area to be detected by the radar device 3 (in detail, outward of a running path to be forecasted by the running path forecast means 6), information of the obstacle (reflector of the guardrail) is not outputted. In this case, presumption by the presumption means 22 is prohibited by the restriction means 41. Thus, there cannot be made the judgment of the possibility of contact by the contact-possibility judgment means 12 based on the information from the presumption means 22. Accordingly, an automatic braking is prevented so that the entrance into a corner of the vehicle is not interfered. In addition, it is prevented that an alarm frequently generates.

Figure 16:
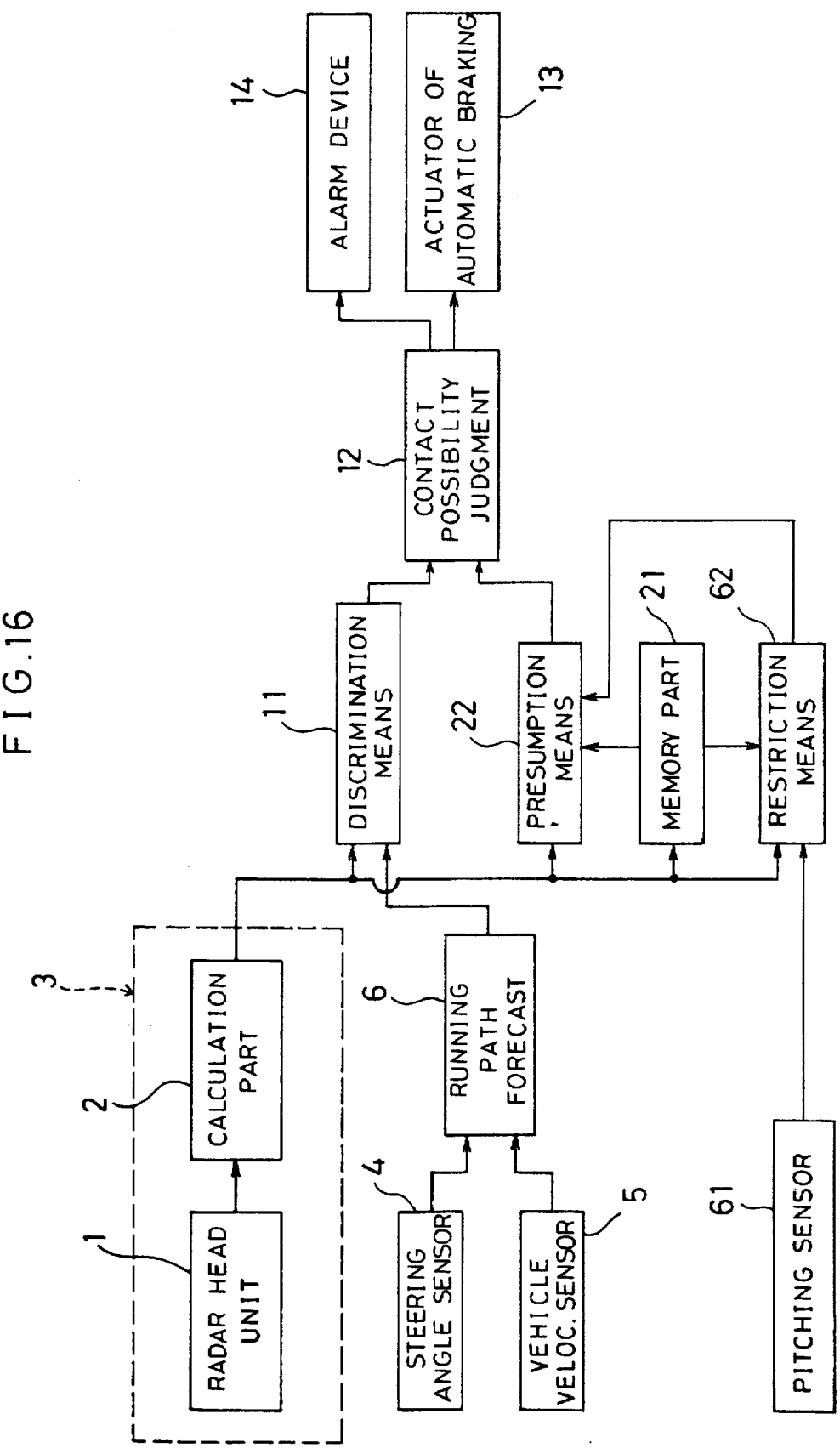
FIGS. 16 and 17 show a seventh embodiment of the present invention.

FIG. 16 is a block diagram showing an arrangement of a seventh embodiment of a vehicle run safety apparatus according to the present invention. In the seventh embodiment, as in the first embodiment, the vehicle run safety apparatus comprises: a scan-type radar device 3 composed of a radar head unit 1 and a calculation part 2; a steering angle sensor 4; a vehicle velocity sensor 5; running path forecast means 6 for forecasting a running path of a vehicle; discrimination means 11 for discriminating a nearest obstacle existing in an area along the running path; contact-possibility judgment means 12 for judging a possibility of contact of the vehicle with the nearest obstacle; an automatic braking device (an actuator thereof) 13; an alarm device 14; a memory part 21 for memorizing, for a set period, information of obstacles outputted from the radar device 3 (the calculation part 2); and presumption means 22 for successively presuming, when information of the obstacle is not outputted from the radar device 3, a present value of a distance between the vehicle and the obstacle for a set time based on the information of the obstacle in the memory part 21 obtained until the time.

The vehicle run safety apparatus of the seventh embodiment is different, from that of the first embodiment, in the following matters: the apparatus of the seventh embodiment does not have detection means 23 in the first embodiment; the apparatus of the seventh embodiment has a pitching sensor 61 as pitching-amount detection means for detecting a pitching amount of the vehicle; and there is different, from the first embodiment, in the contents of restriction in the restriction means 62 for restricting presumption by the presumption means 22 according to a situation at the time when information of an obstacle is not outputted from the radar device 3. The restriction means 62 receives signals from the radar device 3, the memory part 21 and the pitching sensor 61.

Figure 17:
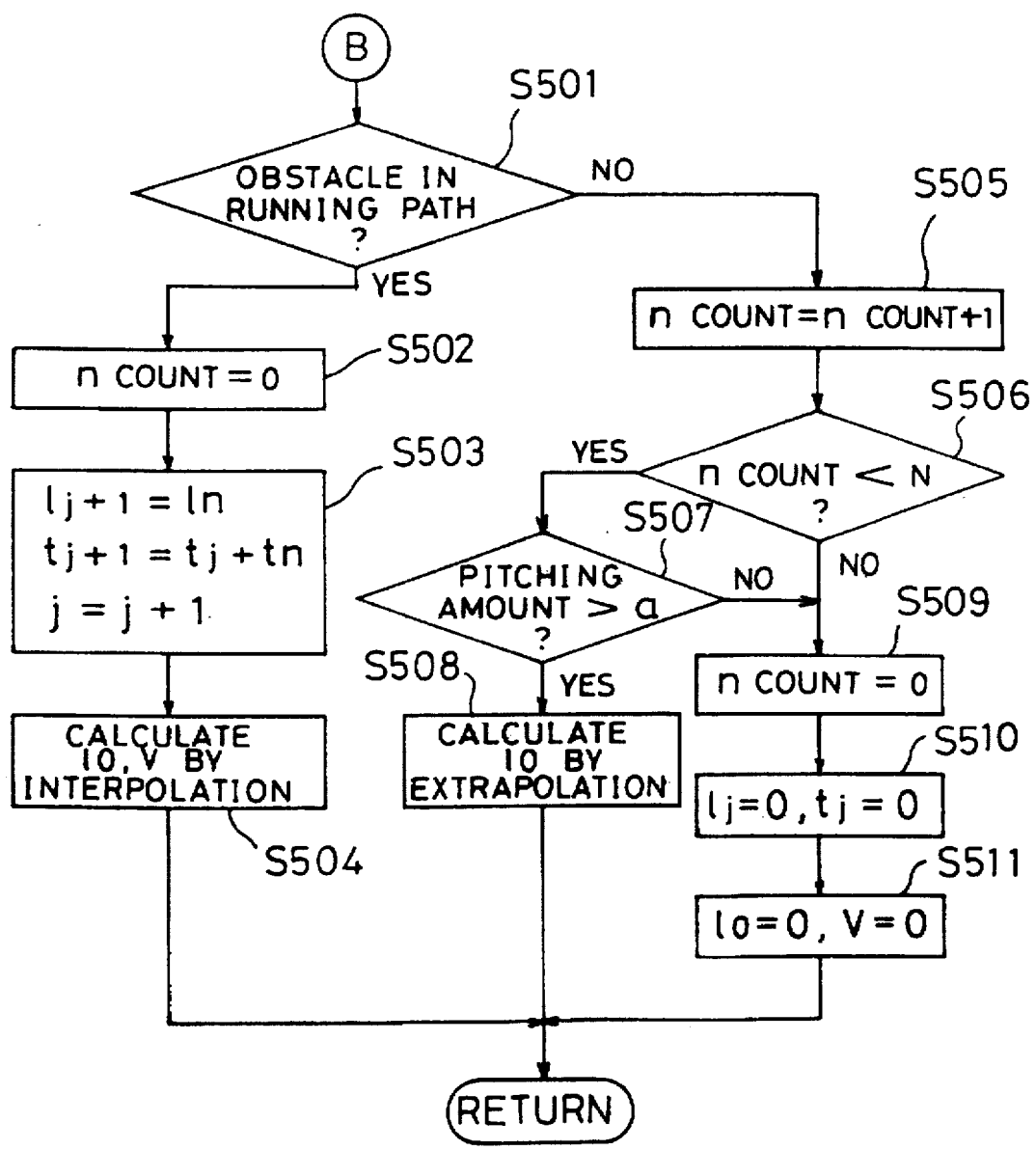

The following will discuss in detail the contents of presumption by the presumption means 22 and restriction by the restriction means 62, with reference to a flow chart shown in FIG. 17. The flow chart in FIG. 17 is successively executed after the flow chart in FIG. 5 for discrimination of a nearest obstacle by the discrimination means 11, the flow chart in FIG. 5 being mentioned above in the second embodiment of this invention.

As shown in FIG. 17, there is judged at a step S501 whether a nearest obstacle exists in a running path of a vehicle. When the judgment is "YES", n count is reset to 0 at a step S502 and various kinds of replacements are conducted to calculate a relative velocity at a step S503. At a step S504, there is calculated a distance 10 between the vehicle and the nearest obstacle at the present time (that is, the present value of the distance) by using interpolation such as a method of least square or the like and then there is calculated a relative velocity V between the vehicle and the nearest obstacle at the present time by using the distance 10. Then, the sequence is returned.

On the other hand, when the judgment at the step S501 is "NO", n count is counted up by 1 at a step S505, there is judged at a step S506 whether n count is less than a set frequency N. When the judgment is "YES", there is judged at a step S507 whether a pitching amount of the vehicle is more than a set value a. When the judgment is "YES", there is calculated at a step S508 a distance 10 between the vehicle and the nearest obstacle at the present time based on the data obtained until the time by using extrapolation. The present value of the distance 10 is presumed by using the distance in and the relative velocity V between the vehicle and the nearest obstacle at the time just before the obstacle is missed according to the following formula:

$$10 = \ln + V \cdot T.$$

In the above formula, T is a passed time since the nearest obstacle was missed.

The presumption of the distance 10 is executed by the presumption means 22. After the presumption, the sequence is returned.

When the judgment at the step S506 is "NO", that is, when a set time has passed since the nearest obstacle was missed, or when the judgment at the step S507 is "NO", that is, when the pitching amount of the vehicle is not more than the set value a, n count is reset to 0 at a step S509 and lj and tj are reset to 0 together at a step S510. At a step S511, the distance 10 and the relative velocity V between the vehicle and the nearest obstacle are reset to 0 together, and then the sequence is returned. Each of the judgments at the steps S506 and S507 is executed by the restriction means 62. When the pitching amount of the vehicle is more than the set value a at the time when information of the obstacle is not outputted from the radar device 3, the restriction means 62 operates so that the presumption by the presumption means 22 is successively executed for a set time. When the pitching amount is not more than the set value a, the restriction means 62 prohibits the presumption by the presumption means 22.

The following will discuss the operation and effects of the seventh embodiment. When information of an obstacle is not outputted from the radar device 3, the restriction means 62 verifies whether a set time has passed since the nearest obstacle was missed and judges whether a pitching amount of the vehicle is more than a set value a based on signals from the pitching sensor 61. When the pitching amount is more than the set value a, according to the information in the memory part 21 obtained until the non-output time of the obstacle information, the presumption means 22 keeps a present value of a relative velocity V between the vehicle and the obstacle a prior value and successively presumes a present value of a distance 10 between the vehicle and the obstacle for a set time. Then, the contact-possibility judgment means 12 judges a possibility of contact of the vehicle with the obstacle based on the information from the presumption means 22. When the possibility of contact exists, the contact-possibility judgment means 12 applies an alarm and an automatic braking as measures for avoiding the contact. Thus, there can be avoided the contact of the vehicle with the obstacle.

When the pitching amount is not more than the set value a, presumption by the presumption means 22 is prohibited by the restriction means 62. Thus, there cannot be made the judgment of the possibility of contact by the contact-possibility judgment means 12 based on the information from the presumption means 22. This previously prevents unnecessary applications of an alarm and an automatic braking.

In the seventh embodiment, the restriction means 62 is so composed that when the pitching amount of the vehicle is more than the set value a at the time when information of the obstacle is not outputted from the radar device 3, presumption by the presumption means 22 is successively executed for a set time, and that when the pitching amount is not more than the set value a, the presumption by the presumption means 22 is prohibited. In the present invention, however, for example, the restriction means 62 may be so composed that when the pitching amount of the vehicle is more than the set value a, a duration of the presumption by the presumption means 22 is extended, and that when the pitching amount is not more than the set value a, the duration of the presumption by the presumption means 22 is reduced.

We claim:

1. A vehicle run safety apparatus, comprising:
   a radar device for detecting an obstacle which exists ahead of a vehicle by transmitting radar waves forward of the vehicle and generating a signal indicative of a distance between the obstacle and the vehicle;
   presumption means for presuming at least a present value of the distance between the vehicle and the obstacle based on information obtained up to a time when information of the obstacle is not outputted from said radar device;
   contact-possibility judgment means for judging a possibility of contact of the vehicle with the obstacle based on information of the obstacle detected by said radar device and for judging the possibility of contact based on information from said presumption means when the information of the obstacle is not outputted from said radar device; and
   restriction means for changing a duration that said presumption means continuously performs the presumption, according to the distance between the obstacle and the vehicle at the time when the information of the obstacle is not outputted from said radar device.

2. The vehicle run safety apparatus according to claim 1, wherein said restriction means extends the duration of the presumption by said presumption means if the distance between the vehicle and the obstacle at the time just before the information of the obstacle is not outputted from said radar device is longer than a set value.

3. The vehicle run safety apparatus according to claim 1, wherein, when the distance between the vehicle and the obstacle at the time just before the information of the obstacle is not outputted from said radar device is more than a set value, said restriction means extends the duration of the presumption by said presumption means longer than that when the distance is not more than the set value.

4. The vehicle run safety apparatus according to claim 3, wherein the set value is a function of physical values relating to a running condition of the vehicle.

5. The vehicle run safety apparatus according to claim 4, wherein the running condition of the vehicle includes a velocity of the vehicle, a relative velocity between the vehicle and the obstacle and a friction coefficient of a road surface on which the vehicle runs.

* * * * *